United States Patent
Chung et al.

(10) Patent No.: US 8,203,513 B2
(45) Date of Patent: Jun. 19, 2012

(54) LOW COLOR SHIFT LIQUID CRYSTAL DISPLAY AND ITS DRIVING METHOD

(75) Inventors: Te-Chen Chung, Kunshan (CN); Tean-Sen Jen, Kunshan (CN); Chia-Te Liao, Kunshan (CN); Lian-Bo Mao, Kunshan (CN); Junrui Zhang, Kunshan (CN)

(73) Assignee: Infovision Optoelectronics (Kunshan) Co., Ltd., Kunshan (CN)

( * ) Notice: Subject to any disclaimer, the term of this patent is extended or adjusted under 35 U.S.C. 154(b) by 703 days.

(21) Appl. No.: 12/334,524

(22) Filed: Dec. 15, 2008

(65) Prior Publication Data

US 2009/0174639 A1 Jul. 9, 2009

(30) Foreign Application Priority Data

Jan. 4, 2008 (CN) .......................... 2008 1 0000316

(51) Int. Cl.
*G09G 3/36* (2006.01)

(52) U.S. Cl. .............. 345/88; 345/92; 345/97; 345/208; 345/698

(58) Field of Classification Search .................. 345/76, 345/87, 204, 205, 97, 92, 211, 88, 208, 698; 349/42, 129
See application file for complete search history.

(56) References Cited

U.S. PATENT DOCUMENTS

| | | | |
|---|---|---|---|
| 5,856,815 A * | 1/1999 | Mochizuki et al. | 345/97 |
| 6,498,595 B1 | 12/2002 | Knapp et al. | |
| 2002/0130829 A1* | 9/2002 | Ilda et al. | 345/87 |
| 2003/0063074 A1* | 4/2003 | Kumagawa et al. | 345/204 |
| 2006/0066531 A1* | 3/2006 | Park et al. | 345/76 |
| 2007/0153146 A1* | 7/2007 | Shih | 349/42 |
| 2007/0268434 A1* | 11/2007 | Huang et al. | 349/129 |
| 2008/0007506 A1* | 1/2008 | Chen et al. | 345/92 |
| 2008/0018573 A1* | 1/2008 | Hsieh et al. | 345/87 |
| 2008/0036751 A1* | 2/2008 | Yamazaki | 345/205 |
| 2009/0161055 A1* | 6/2009 | Huang et al. | 349/129 |
| 2011/0169809 A1* | 7/2011 | Shih | 345/211 |

FOREIGN PATENT DOCUMENTS

| | | |
|---|---|---|
| CN | 1720480 A | 1/2006 |
| CN | 1834762 A | 9/2006 |
| CN | 101004502 A | 7/2007 |

OTHER PUBLICATIONS

Aram shin et al., "A New Organic Thin-film Transistor based Current-driving Pixel Circuit for Active-Maxtrix Organic Light-emitting Displays", IEEE, 2007, pp. 1-5.*

* cited by examiner

*Primary Examiner* — Thuy Pardo
(74) *Attorney, Agent, or Firm* — Aaron Wininger; Perkins Coie LLP

(57) ABSTRACT

A low color shift liquid crystal display and a driving method thereof are provided. The liquid crystal display comprises a plurality of data lines; a plurality of scanning lines arranged across the plurality of data lines, two adjacent scanning lines and two adjacent data lines arranged across the two adjacent scanning lines together defining a pixel region; and a plurality of pixels each comprising a first and a second sub-pixels. The first sub-pixel is connected to a first scanning line of the two adjacent scanning lines, the second sub-pixel includes a compensation capacitor, which is coupled to a second scanning line of the two adjacent scanning lines. Thereby a voltage difference can be maintained between the two sub-pixels under the same driving condition, and the voltage difference can be easily adjusted by suitably changing the waveforms of scanning drive signals on the scanning lines.

13 Claims, 18 Drawing Sheets

LOW COLOR SHIFT LIQUID CRYSTAL DISPLAY AND ITS DRIVING METHOD

TECHNICAL FIELD

The invention relates to a liquid crystal display, and in particular, to a low color shift liquid crystal display and a driving method for the same.

BACKGROUND

Liquid crystal displays (LCDs) are widely utilized in various electronic products, such as electronic watches, calculators or the like. In order to provide a wide viewing angle, Fujitsu Corp proposed a technique of Multi-domain Vertical Alignment (MVA) in 1997. The technique of MVA not only can provide a view angle of 160°, but also can achieve a high contrast ratio and fast response. However, the technique of MVA has a remarkable disadvantage, i.e. a phenomenon of color shift occurs in the case of wide viewing angle. For example, the color of human skin will be shown inaccurately, especially the color of Asian skin.

FIG. 1 schematically shows a diagram of the relationship between voltages applied to a pixel and transmittances of liquid crystal molecules in an LCD employing the technique of MVA, where the horizontal axis represents the voltages in units of Volts applied to the pixel, and the vertical axis represents the transmittances of liquid crystal molecules. When human eyes look at an LCD employing the technique of MVA straightly, the variation of transmittance with the applied voltages is indicated by the curve 101; when human eyes look at the LCD obliquely, the variation of transmittance with the applied voltages is indicated by the curve 102. As shown in FIG. 1, there exists a deviation in the curve 102 compared with the curve 101. In the region 100 of the curve 102, the transmittance of liquid crystal molecules is not quickly increased with the increase of the applied voltages just like the case of human eyes straightly looking at the LCD, the increase speed thereof is obviously reduced and thereby an ideal transmittance cannot be reached. Such a phenomenon is the main reason that causes the color shift.

Conventionally, a method for solving the above problem is to form two sub-pixels in a pixel which may have different relationship curves of the transmittance and the applied voltages so as to compensate the deviation of the relationship curve of the applied voltage and the transmittance in the case of oblique viewing. As illustrated in FIG. 2, the curve 201 is the relationship curve of the transmittance and the applied voltages corresponding to a first sub-pixel in the pixel, while the curve 202 is the relationship curve of the transmittance and the applied voltages corresponding to a second sub-pixel in the same pixel. As shown by the curve 203 in FIG. 2, the better relationship curve of the transmittance and the applied voltages can be achieved by the superposition of the two curves 201 and 202, i.e. by the superposition of the optic characteristics of the two sub-pixels.

As a result, how to produce at least two sub-pixels in one pixel and make the individual sub-pixels applied with different pixel voltages under a same drive signal becomes the object to be sought. Based on this object, a plurality of pixel structures for compensating color shift have been proposed. FIG. 3 shows two pixel structures including two sub-pixels in the prior art, wherein by appropriately designing capacitance parameters of the two sub-pixels during the manufacturing of the LCD (for example, designing different values of $C_{cp}$ or adjusting the values of storage capacitor Cst of the two sub-pixels), the two sub-pixels may have different voltages when displaying, and thereby the phenomenon of color shift can be compensated by superposition of the optic characteristics of the two sub-pixels.

Although the color shift can be compensated to some extent by using the pixel structures shown in FIG. 3, the disadvantage of these structures is that it is almost impossible for the capacitance parameters to be modified after the designing and manufacturing of an LCD. Because of the disadvantage, the application of such types of LCDs is not flexible enough. Moreover, during the application of these LCDs, the capacitance parameters thereof may be slightly changed and as a result, the expected compensation effect for color shift cannot be achieved. Therefore, it is desirable to design such an LCD structure that the voltage difference between sub-pixels in the pixel structure can be easily adjusted without changing structural parameters of the LCD and thus the compensation effect for color shift can be adjusted.

A liquid crystal display is disclosed in the patent publication No. CN 101004502A, in which the adjustment to the voltage difference between sub-pixels in the pixel structure is realized by providing a number of voltage supplies for applying common voltages to pixel units. The pixel structure of the LCD is shown in FIG. 4. In such an LCD, the voltage difference between sub-pixels is generated by coupling common electrodes of different sub-pixels to voltage supplies having different voltages, and the voltage difference between the sub-pixels can be changed by adjusting the voltage waveforms supplied by those voltage supplies. Although it is achieved that the voltage difference between the sub-pixels in the pixel structure being adjusted by such an LCD, the provided voltage supplies are too many and the pixel structure is too complex.

SUMMARY OF THE INVENTION

The invention is to provide a novel low color shift LCD with a simple pixel structure and a driving method for the LCD, so that not only the appropriate voltage difference can be generated for compensating color shift, but also the compensation effect can be conveniently adjusted even after the designing and manufacturing of the LCD.

According to an embodiment of the invention, a liquid crystal display panel comprises a number of data lines; a number of scanning lines arranged across the number of data lines, the two adjacent scanning lines and the two adjacent data lines arranged across the two adjacent scanning lines together defining a pixel region; and a number of pixels, each of which comprises at least two sub-pixels and is provided with the scanning drive signal by a first scanning line of the two adjacent scanning lines that define the pixel region. One of the two sub-pixels includes a compensation capacitor that is coupled to a second scanning line of the two adjacent scanning lines.

According to another embodiment of the invention, a driving method for driving the above-described LCD panel comprises: within a frame, a first high level scanning drive signal and a second high level scanning drive signal are sequentially applied to the first scanning line and the second scanning line, so that the data drive voltage can be applied to the pixels via the data lines; and when the first high level scanning drive signal becomes a low level signal, an adjusting voltage signal is applied to the second scanning line, wherein the level of the adjusting voltage signal is determined in accordance with the desired voltage difference between the two sub-pixels and not beyond the level of the second high level scanning drive signal on the second scanning line.

With the LCD panel and the driving method of the invention, by properly designing waveforms of drive signals on scanning lines, a coupling voltage can be generated on the pixel electrode of the sub-pixel connected to a compensation capacitor by the compensation capacitor according to voltage signals on the scanning lines, and thereby the pixel voltage of the sub-pixel can be adjusted. Consequently, the sub-pixels having different pixel voltages can be produced in a single pixel unit so as to achieve expected effect for compensating color shift, and the voltage difference between the sub-pixels can be easily adjusted even after the designing and manufacturing of a LCD.

BRIEF DESCRIPTION OF THE DRAWINGS

From the following detailed description to the embodiments, accompanying with the drawings, the present invention will be more apparent. In the drawings.

DETAILED DESCRIPTION OF EMBODIMENTS

According to the invention, in order to eliminate the phenomenon of color shift, a pixel unit can be divided into a first sub-pixel and a second sub-pixel having different pixel voltages so as to compensate optic characteristics of the pixel. Meanwhile, the pixel voltage of the second sub-pixel can be adjusted by the voltage of the scanning signal, so that the voltage difference between the two sub-pixels can be adjusted and thus the phenomenon of color shift in the pixel unit can be alleviated. In the invention, scanning signals can be implemented with two-level driving signals which comprise two different voltage values or four-level driving signals which comprise four different voltage values.

A first embodiment of the invention will be described with reference to FIGS. 5-8.

Figure 1:
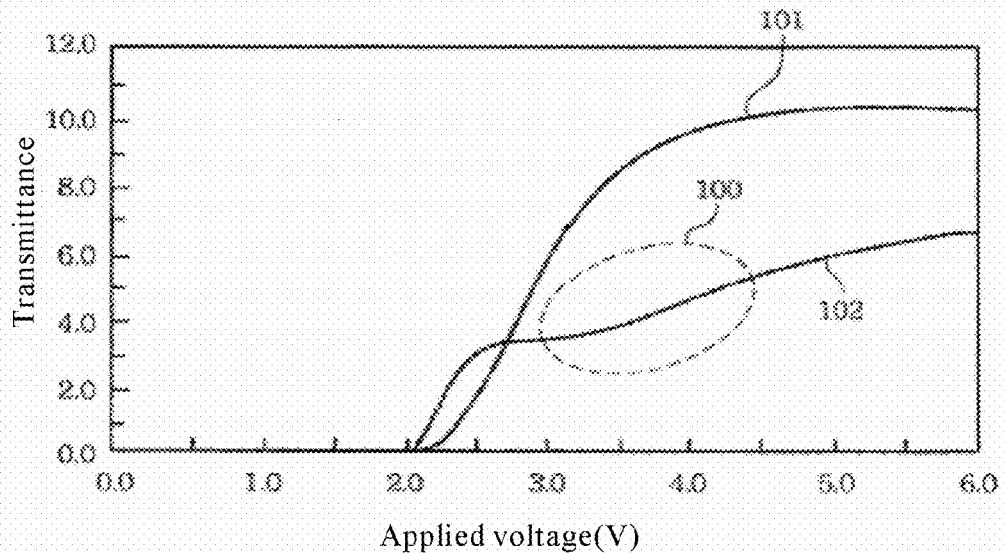
FIG. 1 and FIG. 2 show diagrams of the relationships between voltages applied to a pixel and transmittances of liquid crystal molecules.
Figure 2:
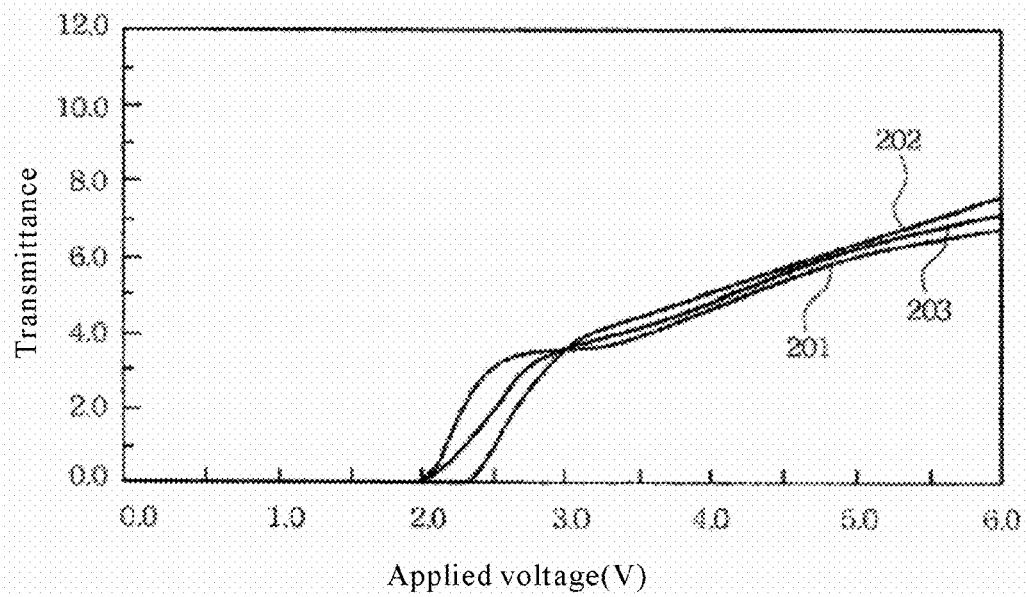
Figure 3:
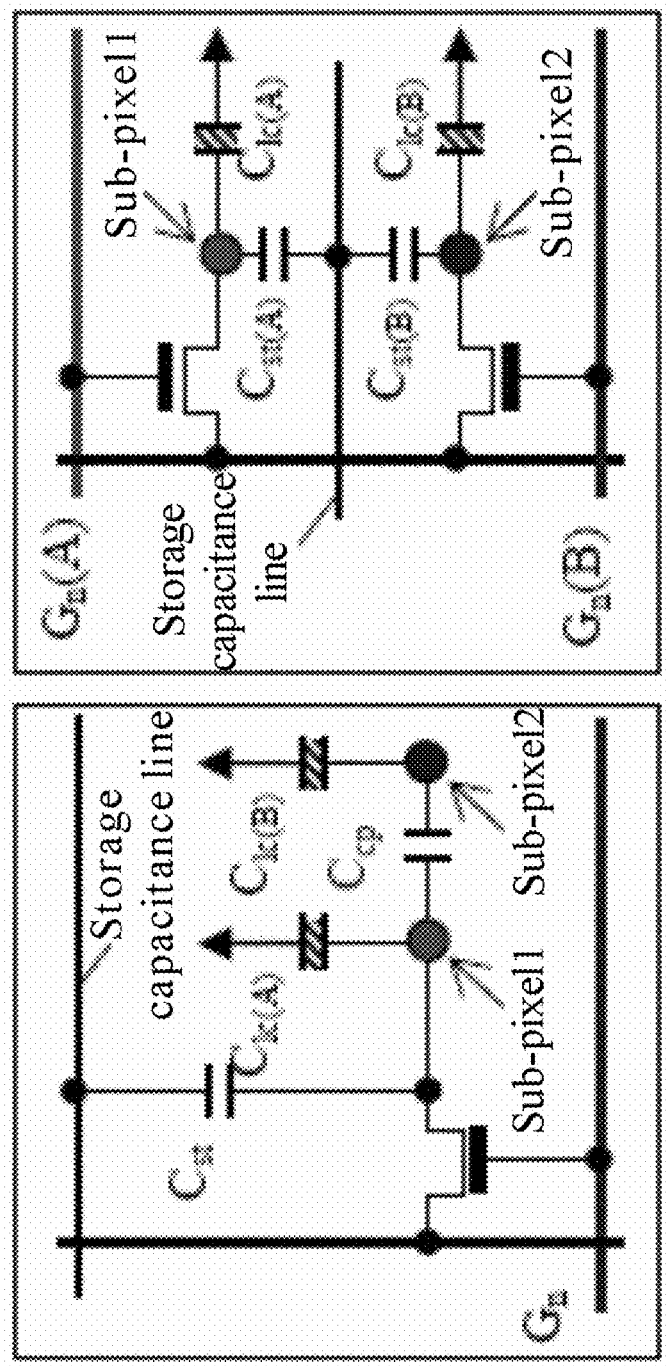
FIG. 3 shows a schematic diagram of two kinds of pixel structures for performing color shift compensation in the prior art.
Figure 4:
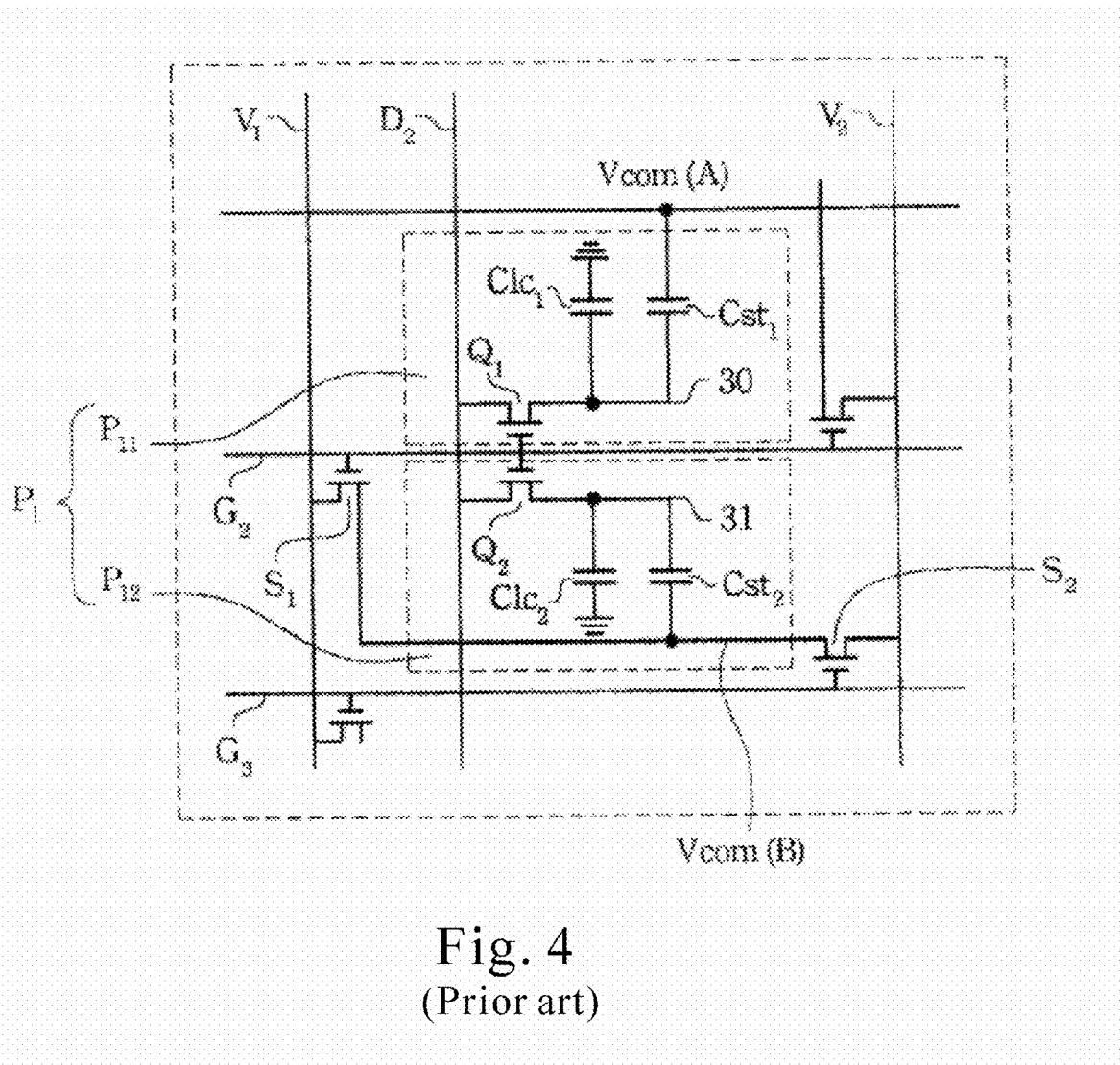
FIG. 4 shows a schematic diagram of the pixel structure in a conventional LCD, in which the voltage difference between sub-pixels can be adjusted by changing the voltage of a common electrode.
Figure 5:
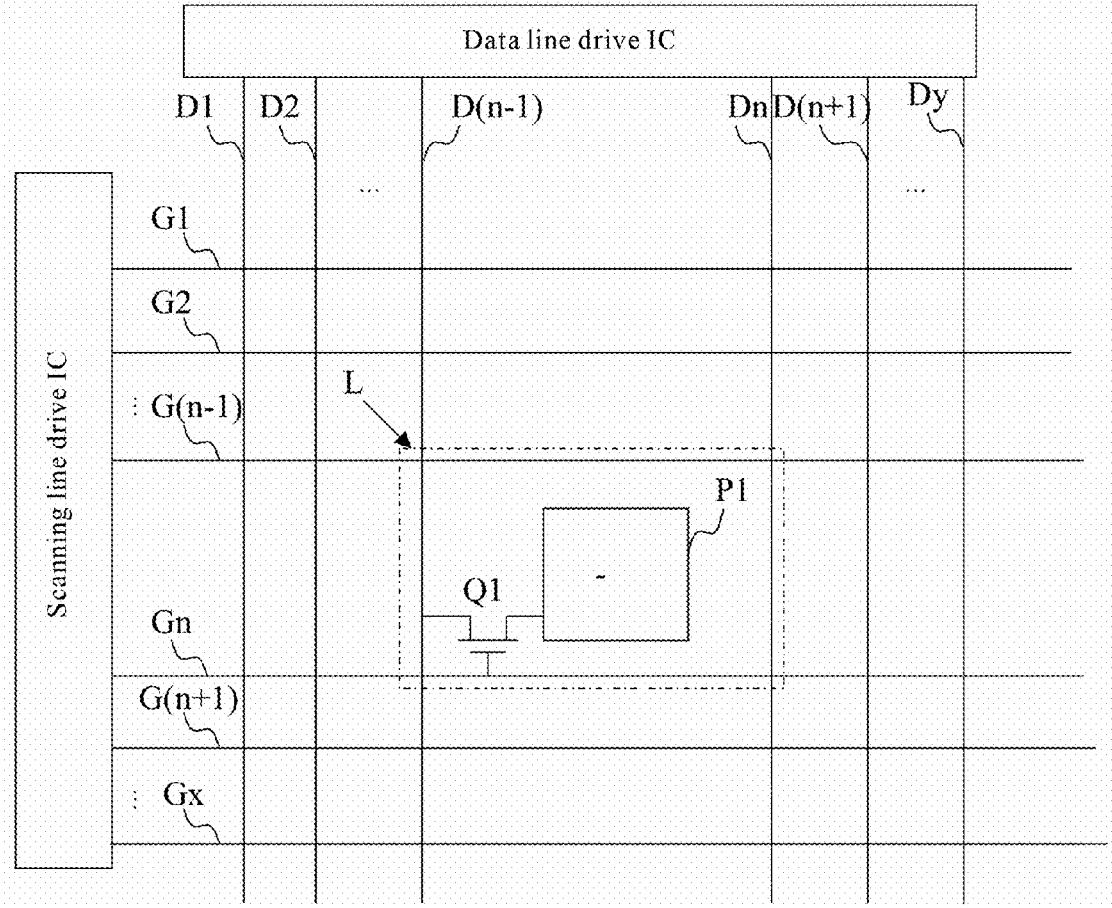
FIG. 5 is a schematic planform of a liquid crystal display (LCD) according to a first embodiment of the invention.

FIG. 5 is a schematic planform of a liquid crystal display (LCD) according to the first embodiment of the invention. As shown in FIG. 5, in the LCD of the embodiment, a plurality of data lines D1, D2 . . . Dn . . . Dy coupled to a data line drive IC and a plurality of scanning lines G1, G2 . . . Gn . . . Gx coupled to a scanning line drive IC are arranged vertically across each other, and the data line D(n−1) and the scanning line Gn together with the switch Q1 and a pixel P1 constitute a region L. The LCD employs a conventional Line Inversion driving, that is, the driving polarities of pixels are repeatedly inverted line by line per frame.

Figure 6:
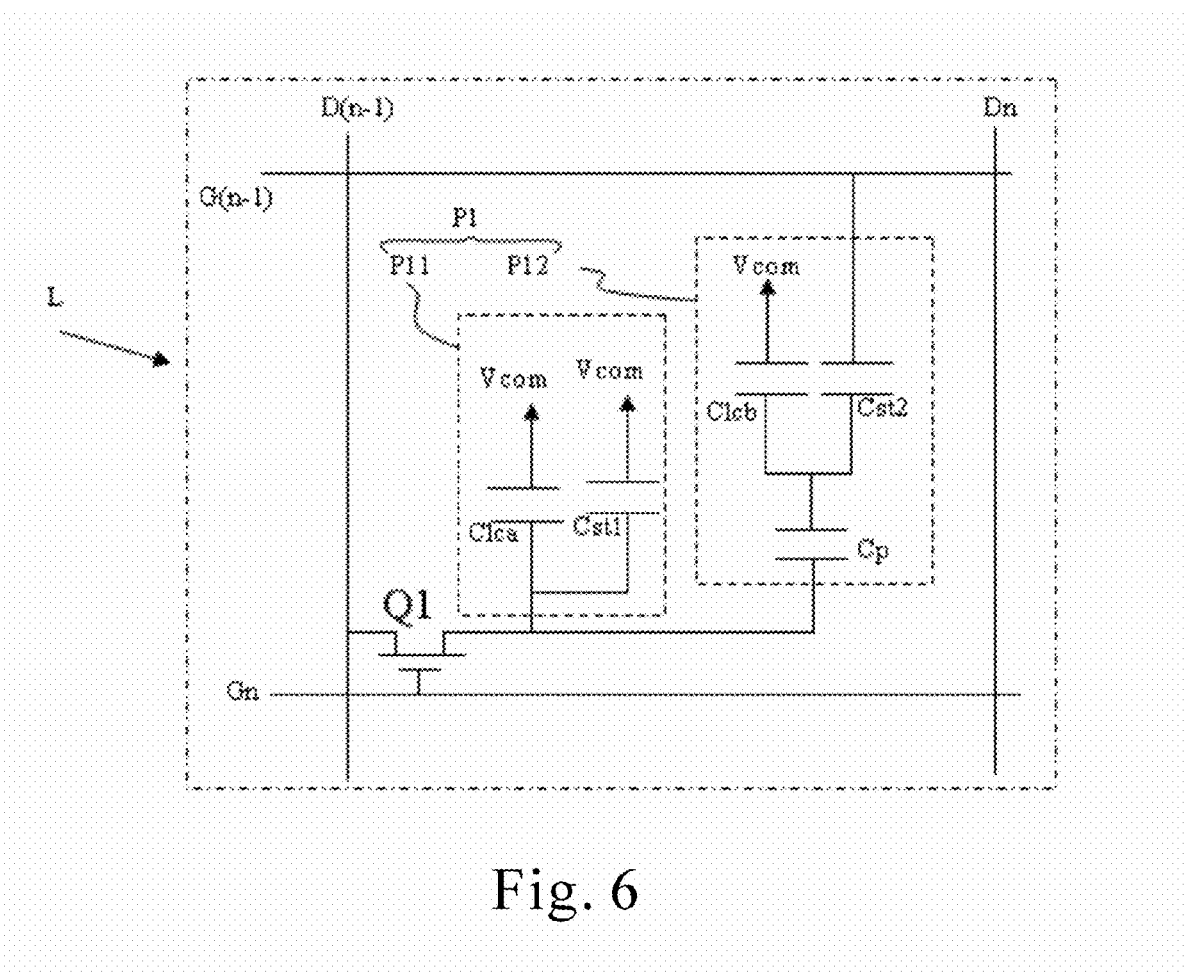
FIG. 6 shows an equivalent circuit of the region L in FIG. 5.

FIG. 6 shows an equivalent circuit of the region L in FIG. 5. According to the first embodiment of the invention, each pixel P1 is divided into at least a first sub-pixel P11 and a second sub-pixel P12. As illustrated, the first sub-pixel P11 comprises a first liquid crystal capacitor Clca and a first storage capacitor Cst1. The second sub-pixel P12 comprises a second liquid crystal capacitor Clcb, a second storage capacitor Cst2 and a basic capacitor Cp. One terminal of the second storage capacitor Cst2 is coupled to a pixel electrode of the second sub-pixel P12 and the other terminal thereof is coupled to the scanning line G(n−1). When the scanning signal on the scanning line Gn turns a switch Q1 ON, the data voltage on the data line D(n−1) is applied to the first liquid crystal capacitor Clca and the first storage capacitor Cst1 in the first sub-pixel P11 via the switch Q1, and the voltage on the data line D(n−1) is also applied to the second liquid crystal capacitor Clcb and the second storage capacitor Cst2 in the second sub-pixel via the switch Q1 and further the basic capacitor Cp. Moreover, a coupling voltage is generated on the second liquid crystal capacitor Clcb by the second storage capacitor Cst2 depending on the voltage on the scanning line G(n−1). As can be seen, the second storage capacitor Cst2 functions to not only maintain the pixel voltage, but also compensate (i.e. adjust) the voltage of the sub-pixel depending on the voltage signal on the scanning line G(n−1). So the second storage capacitor Cst2 in the first embodiment corresponds to the compensation capacitor of the invention. In the pixel structure according to the embodiment, not only a certain pixel voltage difference between the second sub-pixel P12 and the first sub-pixel P11 can be maintained by the basic capacitor Cp, but also the coupling voltage on the second liquid crystal capacitor Clcb can be adjusted depending on the voltage on the scanning line G(n−1) so that the pixel voltage difference between the two sub-pixels can be adjusted. Note that the pixel structure described in the invention is only for exemplification. In the second sub-pixel, it is unnecessary for the second storage capacitor Cst2 to be coupled to the scanning line G(n−1), and instead, another capacitive element can be coupled between the pixel electrode of the sub-pixel and the scanning line G(n−1) to act as the compensation capacitor of the invention. In addition, the basic capacitor in the second sub-pixel can also be replaced with any other element that is able to maintain a certain voltage difference between the two sub-pixels. Also, the structures of the first and second sub-pixels can be exchanged with each other.

Figure 7A:
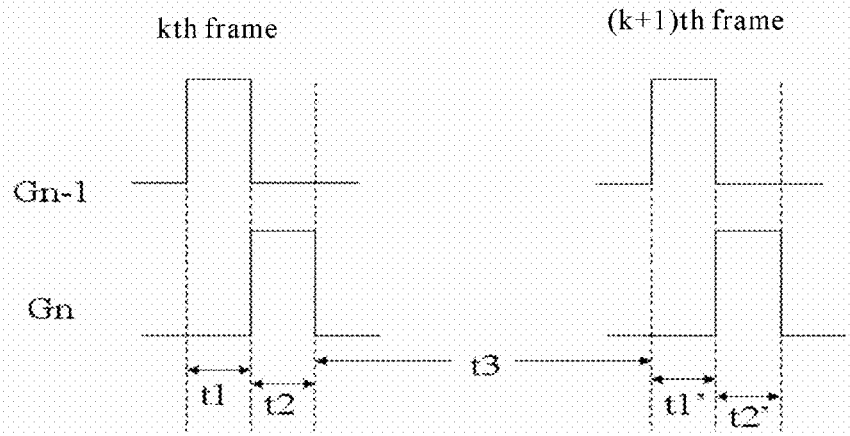
FIG. 7a shows a diagram of the scanning signal waveforms for two-level driving according to the first embodiment of the invention.
Figure 8A:
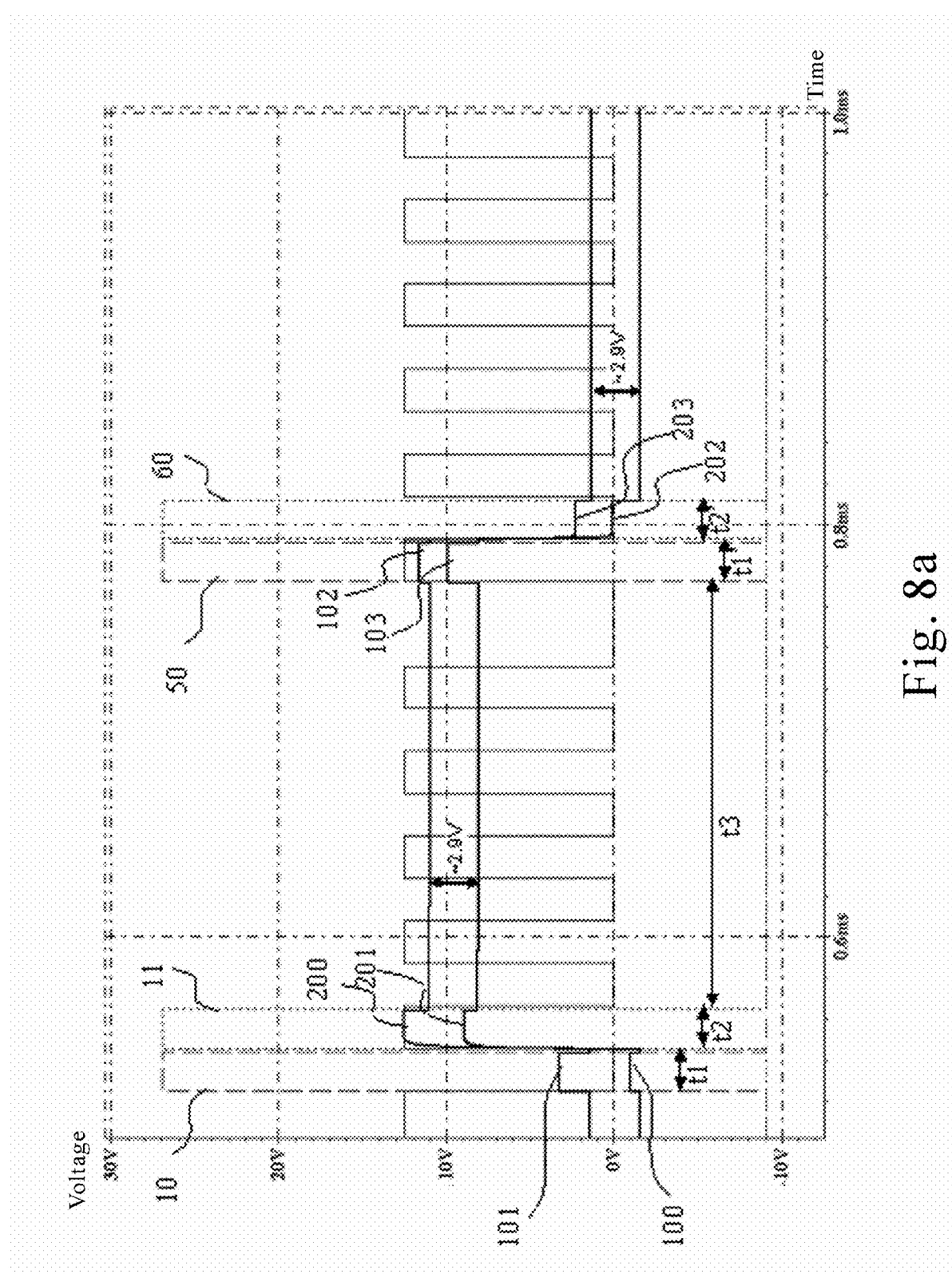
FIG. 8a shows a diagram of simulation being carried out in accordance with the driving waveform of FIG. 7a, according to the first embodiment of the invention.

FIG. 7a shows waveforms of two-level driving scanning signals utilized in the first embodiment of the invention. FIG. 8a shows a diagram of simulation being carried out in accordance with the driving waveforms of FIG. 7a, according to the first embodiment, wherein the pixel voltage of the pixel P1 in different periods of scanning lines being driven by the waveforms of FIG. 7a is illustrated. The two-level driving waveform is a typical and basic driving manner used by LCD panels.

Referring to FIG. 7a, in the kth frame, during the period t1, all the pixels coupled to the scanning line G(n−1) are turned ON and for example charged with negative polarity pixel voltages, while during the period t2, all the pixels coupled to the scanning line Gn are turned ON and for example charged with positive polarity pixel voltages.

Figure 8B:
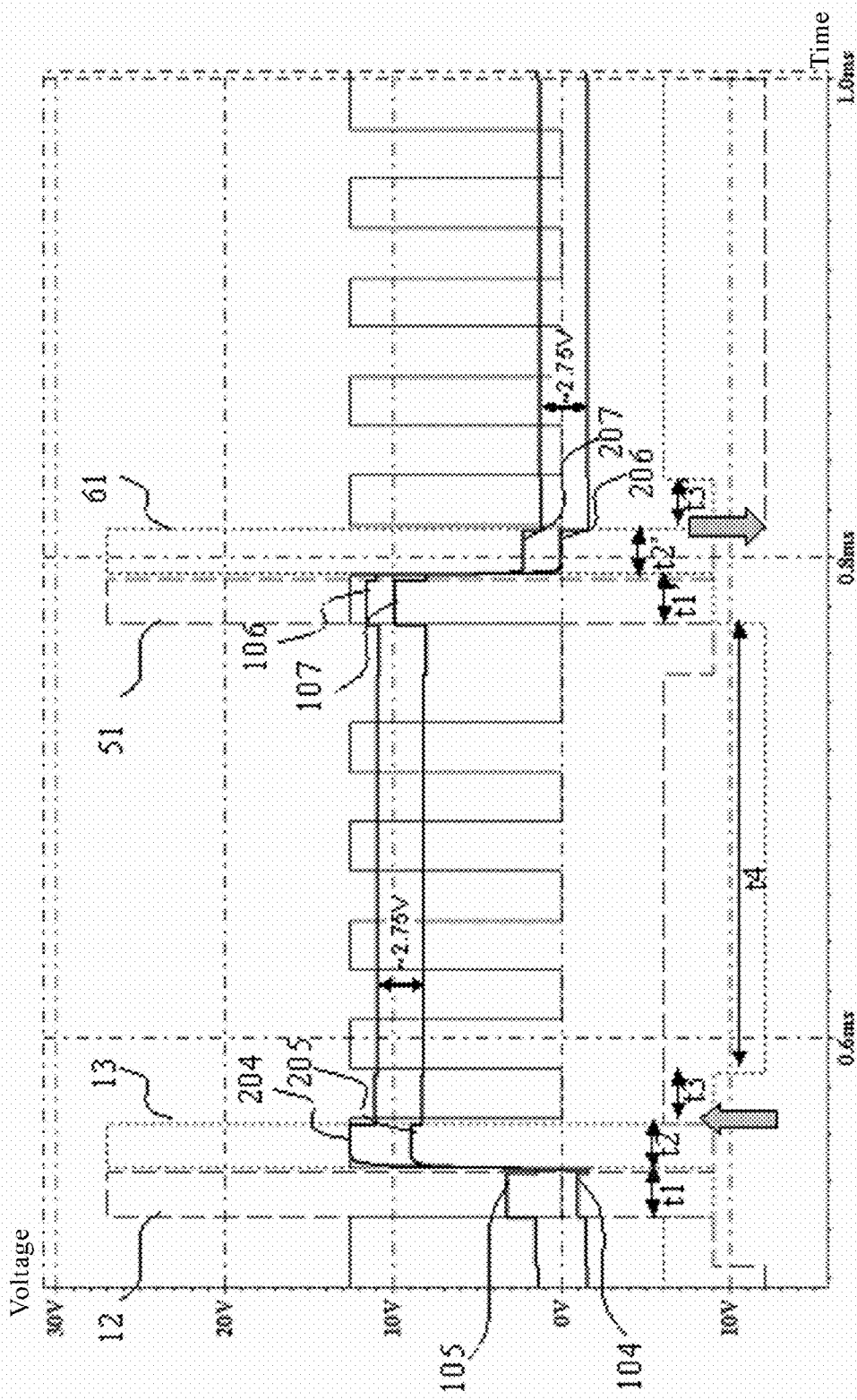
FIG. 8b shows a diagram of simulation being carried out in accordance with the driving waveform of FIG. 7b, according to the first embodiment of the invention.
Figure 8C:
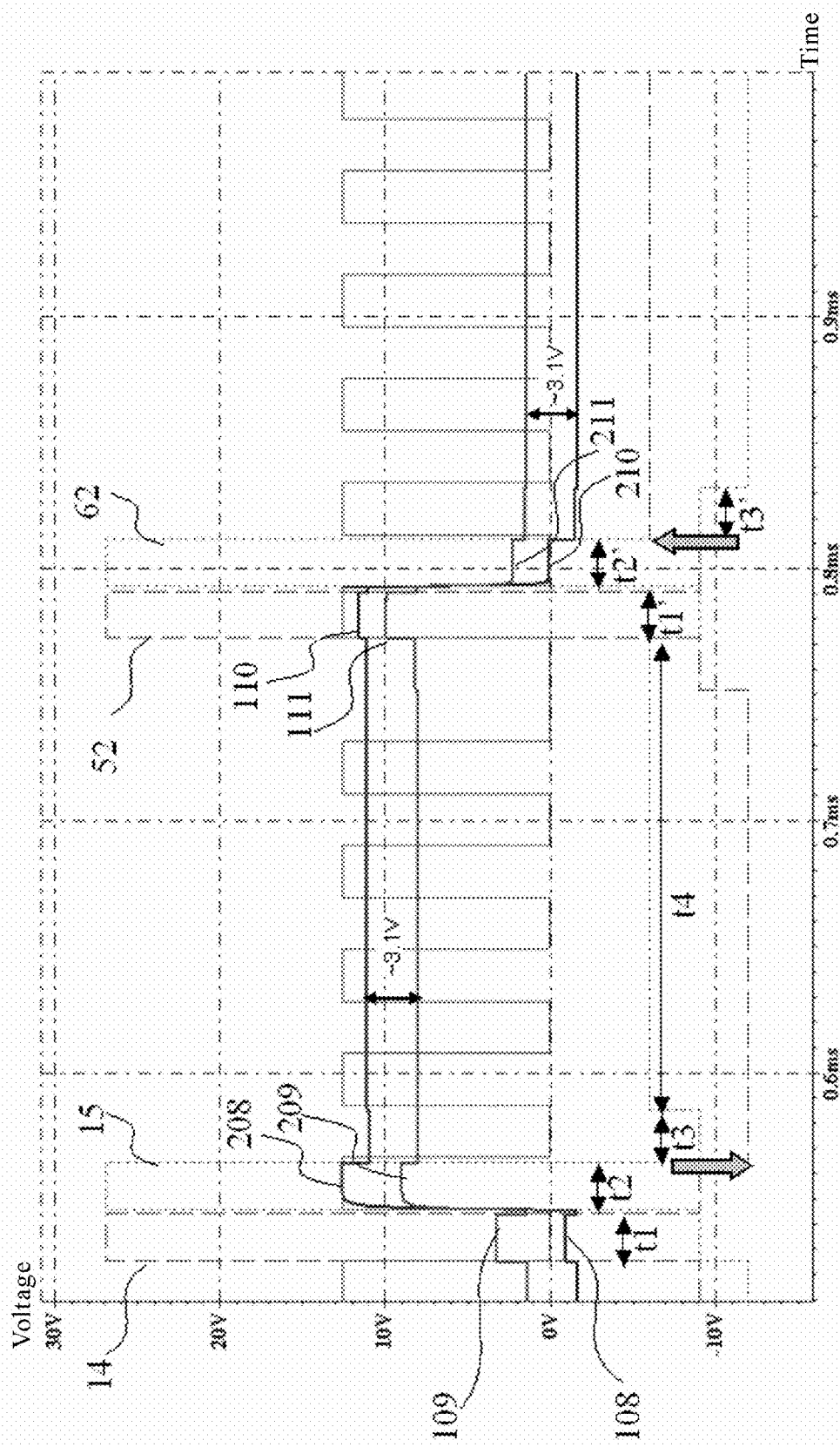
FIG. 8c shows a diagram of simulation being carried out in accordance with the driving waveform of FIG. 7c, according to the first embodiment of the invention.

Below, the variation of the pixel voltage under the two-level driving according to the first embodiment will be illustrated with reference to FIG. 8a. The values of parameters in the simulation are listed as follows: the first liquid crystal capacitor Clca=200 f, the second liquid crystal capacitor Clcb=200 f, the first storage capacitor Cst1=300 f, the second storage capacitor Cst2=20 f, the basic capacitor Cp=250 f, the high level voltage of the scanning signals Vgh=27V, and the low level voltage of the scanning signals Vgl=−9V. Note, these parameter values also apply to simulations as illustrated in FIG. 8b and FIG. 8c.

As shown in FIG. 8a, in the kth frame, during the period t2, the voltage 11 on the scanning line Gn turns the switch Q1 ON, a first positive polarity voltage 200 is charged into the first sub-pixel P11, and a second positive polarity voltage 201 is charged into the second sub-pixel P12. For the pixel unit P1 corresponding to the scanning line Gn and in the Line Inversion driving, during the period t2' in the (k+1)th frame, the voltage 11 on the scanning line Gn turns the switch Q1 ON, a first negative polarity voltage 202 is charged into the first sub-pixel P11, and a second negative polarity voltage 203 is charged into the second sub-pixel P12. The voltage drop of the pixel unit P1 caused by the OFF of the switch Q1 at the ending of the period t2 is referred to as a phenomenon of feed-through (note that the similar phenomenon occurring in FIG. 8b and FIG. 8c will not be described). According to the equivalent circuitry of the region L of the first embodiment shown in the FIG. 6, the presence of the basic capacitor Cp results in a certain voltage difference existing between the charged voltages of the first and second sub-pixels. Consequently, during the period t3+t1' between the two frames, the first sub-pixel P11 and the second sub-pixel P12 individually maintain the respective sub-pixel voltages after feed-through which have a difference value of 2.9V Likewise, during the period t1 in the kth frame, the voltage 10 on the scanning line G(n−1) turns the corresponding switch ON, and negative polarity voltages 101 and 100 are charged into the respective two sub-pixels; while during the period t1' in the (k+1)th frame, the voltage 50 on the scanning line G(n−1) turns the corresponding switch ON, and positive polarity voltages 102 and 103 are charged into the respective two sub-pixels. Note that for clarity, the voltage maintaining period of the pixels corresponding to the scanning line G(n−1) after feed-through is not shown in FIG. 8a. In terms of the two-level driving manner, since the voltage on the scanning line G(n−1) has become the OFF signal with a low level after the switch Q1 is turned ON, the second storage capacitor Cst2 is unable to produce a coupling voltage from the voltage on the scanning line G(n−1), the voltage on the second liquid crystal capacitor Clcb keeps unchanged, and thus the voltage difference between the two sub-pixels maintains 2.9 V.

As can be seen, if the typical scanning signals with two-level driving waveforms are employed, the voltage difference between the two sub-pixels can not be adjusted. Therefore, in order to make an adjustment to the voltage difference, the invention employs scanning signals with four-level driving waveforms that can be suitably designed according to the compensation for color shift. Below, the adjustment to the voltage difference between the sub-pixels by the waveforms of scanning signals will be described with respect to the first embodiment of the invention.

Figure 7B:
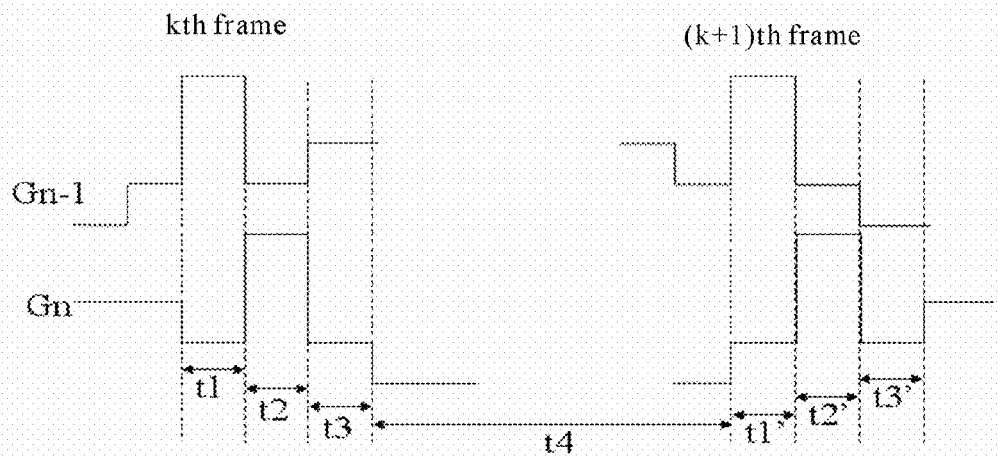
FIG. 7b shows a diagram of the scanning signal waveforms for four-level driving to perform a first type of adjustment according to the first embodiment of the invention.

FIG. 7b shows waveforms of four-level driving scanning signals utilized to implement a first type of adjustment in the first embodiment of the invention. FIG. 8b shows a diagram of simulation being carried out in accordance with the driving waveform of FIG. 7b, according to the first embodiment, wherein the pixel voltage of the pixel P1 in different periods in the case of scanning lines being driven by the waveform of FIG. 7b is illustrated. The four-level driving waveform is used to implement the first type of adjustment, which makes the pixel voltage of the second sub-pixel increased when the pixel polarity is positive and decreased when the pixel polarity is negative. Thus, the voltage difference between the two sub-pixels is able to be decreased no matter whether the pixel polarity is positive or negative.

Figure 7C:
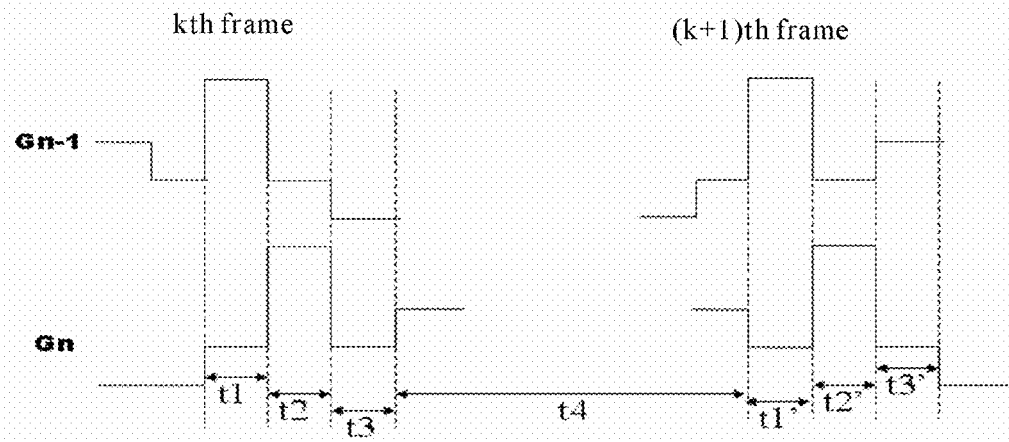
FIG. 7c shows a diagram of the scanning signal waveforms for four-level driving to perform a second type of adjustment according to the first embodiment of the invention.

Referring to FIG. 7b, in the kth frame, during the period t1, all pixels coupled to the scanning line G(n−1) are turned ON and charged with negative polarity pixel voltages, while during the period t2, all pixels coupled to the scanning line Gn are turned ON and charged with positive polarity pixel voltages. At the beginning of the period t3, the voltage signal on the scanning line Gn is shut off, while an ascending voltage occurs on the scanning line G(n−1) and at the beginning of the period t4, a descending voltage occurs on the scanning line Gn. Note that the driving waveforms shown in the FIGS. 7a, 7b and 7c are only illustrative and not outlined in real proportion. The real voltage values of driving signals can be found in the parameter settings in the simulation.

Below, the variation of the pixel voltage under four-level driving according to the first embodiment of the invention will be illustrated with reference to FIG. 8b. The parameters in the simulation are the same as those in two-level driving, except the following two additional parameters special for four-level driving: the ascending adjusting voltage of scanning signals Vgc1=−6V, and the descending adjusting voltage of scanning signals Vgc2=−12V Referring to FIG. 8b, during the period t2 in the kth frame, a voltage 13 on the scanning line Gn turns the switch Q1 ON, a first positive polarity voltage 204 is charged into the first sub-pixel P11 and a second positive polarity voltage 205 is charged into the second sub-pixel P12. At the beginning of the period t3, although the voltage 13 on the scanning line Gn changes to a low voltage and turns the switch Q1 OFF, an ascending voltage occurs on the scanning line G(n−1). At this moment, a coupling voltage depending on the magnitude of the ascending voltage is generated on the second liquid crystal capacitor Clcb by the second storage capacitor Cst2, and thereby an adjusting voltage is generated on the second sub-pixel P12, the value of voltage thereon is increased and finally a voltage difference after feed-through is maintained 2.75 V between the two sub-pixels. Notably, the magnitude of the adjusting voltage can be determined in accordance with the magnitude of the ascending voltage occurring on the scanning line G(n−1) during the period t3 (the description involving the same problem will be no longer described hereinafter).

In the kth frame, the voltage waveform on the scanning line G(n−1) facilitates an adjustment suitable to the case of the positive polarity pixel P1; while in the (k+1)th frame, the pixel unit P1 is negative polarity and thus it is needed to reduce the voltage of the second sub-pixel P12 in order to achieve the adjusting effect of reducing the voltage difference between the two sub-pixels. Therefore, the voltage waveform on the scanning line G(n−1) in the (k+1)th frame is designed the same as the voltage waveform on the scanning line Gn in the kth frame so as to implement an adjustment suitable to the case of the negative polarity pixel P1. During the period t2', the voltage 13 on the scanning line Gn turns the switch Q1 ON, a first negative voltage 206 is charged into the first sub-pixel P11 and a second negative voltage 207 is charged into the second sub-pixel P12. At the beginning of the period t3', although the voltage 61 on the scanning line Gn changes to a low voltage and turns the switch Q1 OFF, a descending voltage occurs on the scanning line G(n−1). At this moment, a coupling voltage depending on the magnitude of the descending voltage is generated on the second liquid crystal capacitor Clcb by the second storage capacitor Cst2, and thereby an adjusting voltage is generated on the second sub-pixel P12, the value of voltage thereon is reduced and finally a voltage difference after feed-through is maintained 2.75 V between the two sub-pixels. During the period t4+t1' between the two frames, the first sub-pixel P11 and the second sub-pixel P12 maintain their respective sub-pixel voltages with a difference 2.75V. Likewise, during the period t1 in the kth frame, the voltage 12 on the scanning line G(n−1) turns the corresponding switch ON, and negative polarity voltages 104 and 105 are charged into the respective two sub-pixels; while during the period t1' in the (k+1)th frame, the voltage 12 on the scanning line G(n−1) turns the corresponding switch ON, and positive polarity voltages 106 and 107 are charged into the respective two sub-pixels. Note that for clarity, the voltage maintaining period of the pixels corresponding to the scanning line G(n−1) is not shown in FIG. 8b.

FIG. 7c shows waveforms of four-level driving scanning signals utilized to implement a second type of adjustment in the first embodiment of the invention. FIG. 8c shows a diagram of simulation being carried out in accordance with the driving waveform of FIG. 7c, according to the first embodiment, wherein the pixel voltage of the pixel P1 in different periods in the case of scanning lines being drived by the waveform of FIG. 7c is illustrated. The four-level driving waveform is used to implement the second type of adjustment, which makes the pixel voltage of the second sub-pixel reduced when the pixel polarity is positive and increased when the pixel polarity is negative. Thus, the voltage difference between the two sub-pixels is able to be increased no matter whether the pixel polarity is positive or negative.

Referring to FIG. 7c, in the kth frame, during the period t1, all pixels coupled to the scanning line G(n−1) are turned ON and for example, charged with negative polarity pixel voltages, while during the period t2, all pixels coupled to the scanning line Gn are turned ON and charged with positive polarity pixel voltages. At the beginning of the period t3, the voltage signal on the scanning line Gn is shut off, while a descending voltage occurs on the scanning line G(n−1) and at the beginning of the period t4, an ascending voltage occurs on the scanning line Gn.

Below, the variation of the pixel voltage under the four-level driving shown in FIG. 7c according to the first embodiment of the invention will be illustrated with reference to FIG. 8c. The parameters in the simulation are the same as those in the simulation described referring to FIG. 8b. Now referring to FIG. 8c, during the period t2 in the kth frame, the voltage 15 on the scanning line Gn turns the switch Q1 ON, a first positive polarity voltage 208 is charged into the first sub-pixel P11 and a second positive polarity voltage 209 is charged into the second sub-pixel P12. At the beginning of the period t3, although the switch Q1 is turned OFF, a descending voltage occurs on the scanning line G(n−1). At this moment, a coupling voltage depending on the magnitude of the descending voltage is generated on the second liquid crystal capacitor Clcb by the second storage capacitor Cst2, and thereby an adjusting voltage is generated on the second sub-pixel P12, the value of voltage thereon is reduced and finally a voltage difference after feed-through is maintained 3.1 V between the two sub-pixels. As for the (k+1)th frame, since the pixel P1 is negative polarity, it is needed to increase the voltage of the second sub-pixel P12 in order to achieve the adjusting effect of increasing the voltage difference between the two sub-pixels. During the period t2', the voltage 15 on the scanning line Gn turns the switch Q1 ON, a first negative polarity voltage 210 is charged into the first sub-pixel P11 and a second negative polarity voltage 211 is charged into the second sub-pixel P12. At the beginning of the period t3', although the switch Q1 is turned OFF, an ascending voltage occurs on the scanning line G(n−1). At this moment, a coupling voltage depending on the magnitude of the ascending voltage is generated on the second liquid crystal capacitor Clcb by the second storage capacitor Cst2, and thereby an adjusting voltage is generated on the second sub-pixel P12, the voltage value on the second sub-pixel P12 is increased and finally a voltage difference after feed-through is maintained 3.1 V between the two sub-pixels. During the period t4+t1' between the two frames, the first sub-pixel P11 and the second sub-pixel P12 maintain their respective sub-pixel voltages with a difference 3.1V Likewise, during the period t1 in the kth frame, the voltage 14 on the scanning line G(n−1) turns the corresponding switch ON, and negative polarity voltages 108 and 109 are charged into the respective two sub-pixels; while during the period t1' in the (k+1)th frame, the voltage 14 on the scanning line G(n−1) turns the corresponding switch ON, and positive polarity voltages 110 and 111 are charged into the respective two sub-pixels.

In summary, we can conclude that in the diagram of four-level driving waveforms for implementing the first type of adjustment according to the first embodiment of the invention, the waveform on the scanning line Gn during the kth frame is the same as the waveform on the scanning line G(n−1) during the (k+1)th frame. Likewise, the same conclusion can be made for the second type of adjustment. Therefore, two kinds of scanning signal waveforms can be designed respectively for odd-numbered lines and even-numbered lines and exchanged with each other in a next frame.

The above description is concerning about the first embodiment of the invention that is specific to an LCD employing Line Inversion driving. However, in the industry of LCD, those LCDs employing Dot Inversion driving are more widely utilized, so pixel structures not only for color shift but also suitable for Dot Inversion driving are provided in a second embodiment of the invention.

The second embodiment of the invention is described with reference to FIGS. 9-15.

Figure 9:
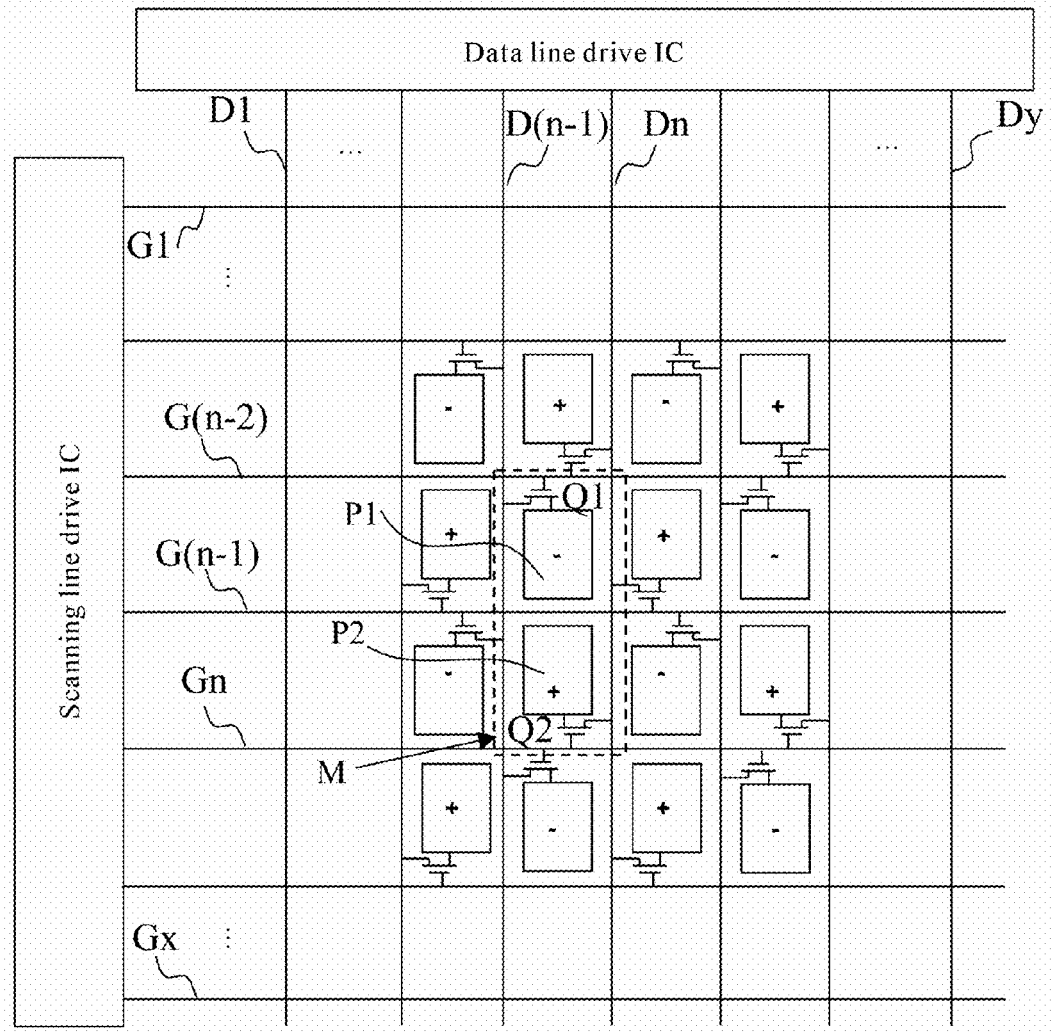
FIG. 9 is a schematic planform of a the liquid crystal display (LCD) according to a second embodiment of the invention.

FIG. 9 is a schematic planform of a liquid crystal display according to the second embodiment of the invention. As shown in FIG. 9, in the LCD of the embodiment, a plurality of data lines D1, D2 . . . Dn . . . Dy coupled to a data line drive IC and a plurality of scanning lines G1, G2 . . . Gn . . . Gx coupled to a scanning line drive IC are arranged vertically across each other. Compared with the first embodiment, the different aspects include that the panel is of so-called "Z" type, the Dot Inversion driving is employed, pixels coupled to the same data line have the same polarity and each scanning line controls pixels with the same polarity in the line. In the figure, a scanning line G(n-2) and a data line D(n-1) together with a switch Q1 define a pixel unit P1, and a scanning line Gn and a data line Dn together with a switch Q2 define a pixel unit P2. Assume that in the current frame, the pixel unit P1 has a negative polarity and the pixel unit P2 has a positive polarity. Note that the polarities of pixel units or pixel voltages are only exemplary throughout the entire description.

Figure 10:
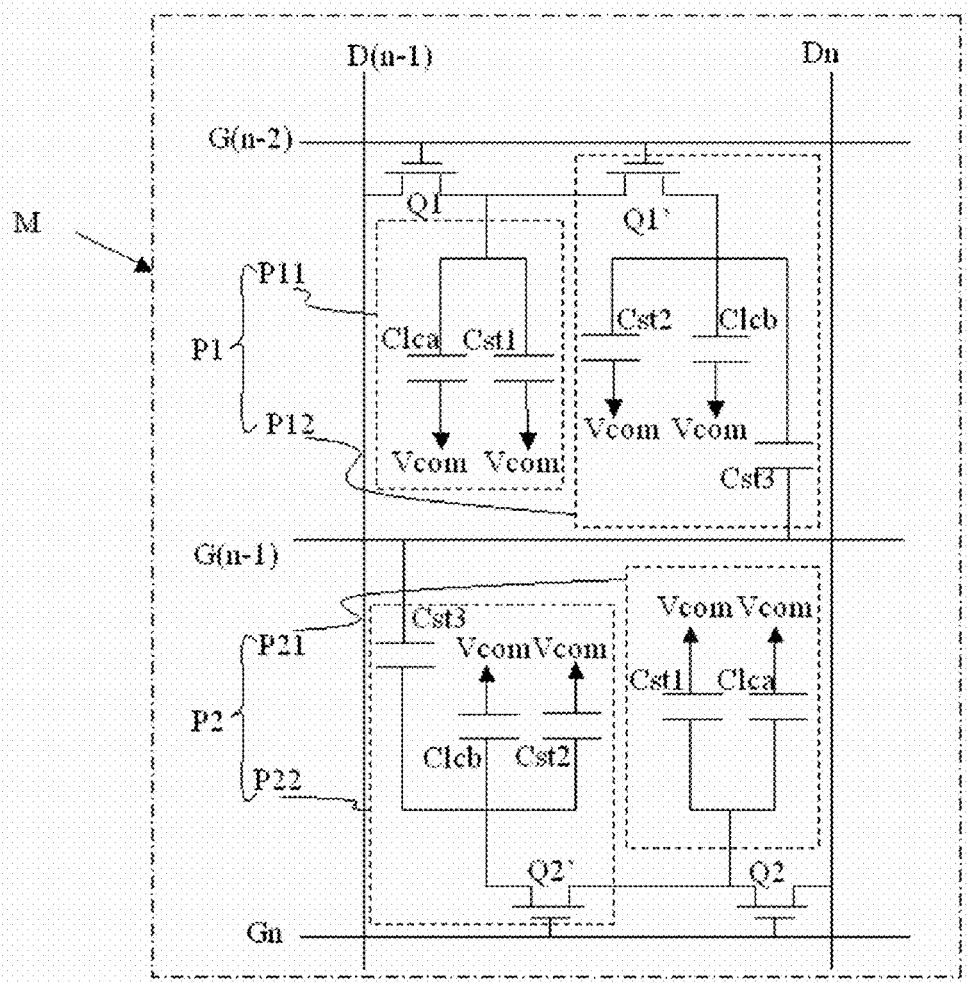
FIG. 10 shows an equivalent circuit of the region M in FIG. 9.

FIG. 10 shows an equivalent circuit of the region M in FIG. 9. According to the second embodiment of the invention, the pixel P1 is divided into at least a first sub-pixel P11 and a second sub-pixel P12 while the pixel P2 is divided into at least a third sub-pixel P21 and a fourth sub-pixel P22.

The first sub-pixel P11 in the pixel P1 includes a first liquid crystal capacitor Clca and a first storage capacitor Cst1. The second sub-pixel P12 in the pixel P1 includes a second liquid crystal capacitor Clcb, a second storage capacitor Cst2, a third storage capacitor Cst3 and a second switch Q1'. A terminal of the third storage capacitor Cst3 is coupled to the scanning line G(n-1) and the gate electrode of the second switch Q1' is coupled to the scanning line G(n-2) so as to control the second sub-pixel P12 in the pixel P1. Additionally, not only the switch Q1 controls the first sub-pixel P11 in the pixel P1, but also the drain electrode of the switch Q1 is coupled to the source electrode of the second switch Q1'. On the basis of such a pixel structure, when the voltage signal on the scanning line G(n-2) turns the switch Q1 ON, the data voltage from the data line D(n-1) is firstly applied to the first liquid crystal capacitor Clca and the first storage capacitor Cst1. Moreover, at this time, the second switch Q1' is also turned ON, the data voltage from the data line D(n-1) is then applied to the second liquid crystal capacitor Clcb and the second storage capacitor Cst2 via the switch Q1 and the second switch Q1'. Since there is a voltage drop between the source and drain electrodes of the switch Q1', a certain voltage difference exists between the first and second sub-pixels. In addition, a coupling voltage can be generated on the second liquid crystal capacitor Clcb by the third storage capacitor Cst3 in accordance with the voltage on the scanning line G(n-1), so that the voltage difference between the two sub-pixels can be adjusted. Thus, the third storage capacitor Cst3 functions to not only maintain the pixel voltage, but also compensate (i.e. adjust) the voltages of the sub-pixels depending on the voltage signal on the scanning line G(n-1). So the third storage capacitor Cst3 in the embodiment corresponds to the compensation capacitor of the invention.

The structure of the pixel P2 is similar to that of the pixel P1, so the related description will be omitted. In the embodiment, a "Z" type panel is utilized, which is characterized in that pixels coupled to the same data line have the same polarity and each scanning line controls pixels with the same polarity in the line. Referring to FIG. 9, the scanning line G(n-2) is coupled to the pixel that are located in the same line as the pixel P1 and also have the same negative polarity as the pixel P1, while all pixels with a positive polarity in the line are coupled to the scanning line G(n-1); and the scanning line Gn is coupled to the pixels that are located in the same line as the pixel P2 and also have the same positive polarity as the pixel P2, while all pixels with a negative polarity in the line are coupled to the scanning line G(n-1). As can be seen from FIG. 9 and FIG. 10, for either the negative polarity pixel P1 or the positive polarity pixel P2, the voltage difference between the sub-pixels therein is adjusted in accordance with the voltage on the scanning line G(n-1).

In the structure, the drain inputs corresponding to the switch Q1/Q2 and the second switch Q1'/Q2' have little difference, so if the voltage on the scanning line G(n-1) is unable to provide a coupling voltage to the third storage capacitor Cst3, there will exist a relative small voltage difference between the pixels P1 and P2. As a result, if we still use the two-level driving waveform shown in FIG. 7a to make a simulation, the diagram of simulation for the positive polarity pixel P2 will be shown as in FIG. 11, which shows that there is only a very small voltage difference 0.04V between the third sub-pixel P21 and the fourth sub-pixel P22. Notably, although in normal cases, a voltage difference 0.04V is not good enough for compensating color shift, it does not impact on the description to the idea of the invention. Moreover, in this case, the voltage waveforms on scanning lines also function to produce the voltage difference, but not just to adjust it. Below, how to utilize the coupling of the voltages of scanning signals to adjust the voltage difference between the two sub-pixels will be described in terms of the second embodiment of the invention.

Figure 11:
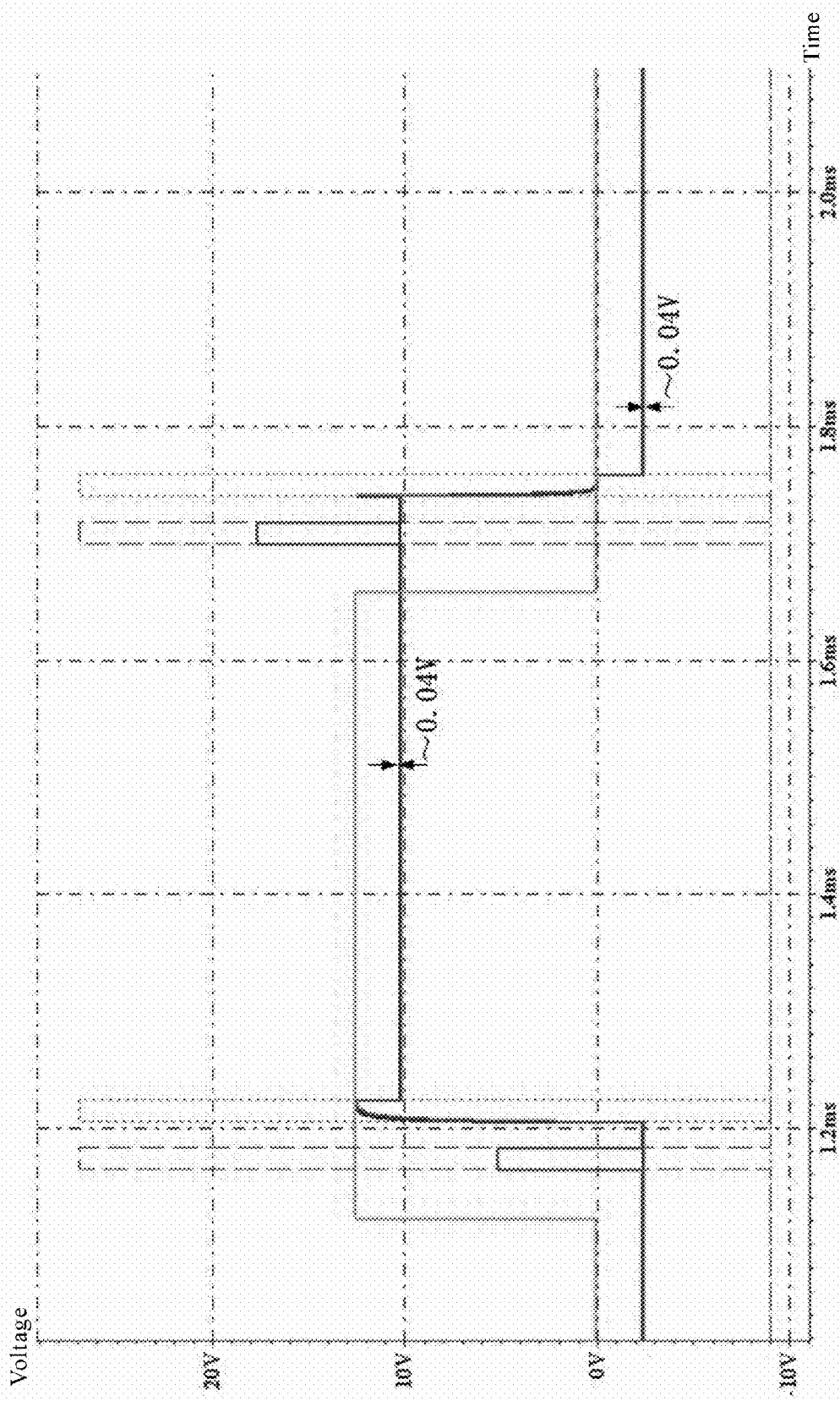
FIG. 11 shows a diagram of simulation being carried out in accordance with the waveform of two-level driving, according to the second embodiment of the invention.

In the second embodiment, the values of parameters in the simulation are listed as follows: the first liquid crystal capacitor Clca=200 f, the second liquid crystal capacitor Clcb=200 f, the first storage capacitor Cst1=300 f, the second storage capacitor Cst2=150 f, the third storage capacitor Cst3=100 f, the high level voltage of the scanning signals Vgh=27V and the low level voltage of the scanning signals Vgl=-9V for both two-level driving and four-level driving; and the ascending voltage of the scanning signal Vgc1=-4V and the descending voltage of the scanning signal Vgc2=-14V only for four-level driving. The sub-pixel voltage difference 0.04V as shown in FIG. 11 is achieved in the case of two-level driving based on the above parameter setting. Below, the first type of adjustment implemented by four-level driving according to the second embodiment of the invention will be described with reference to FIGS. 12, 13a and 13b.

Figure 12:
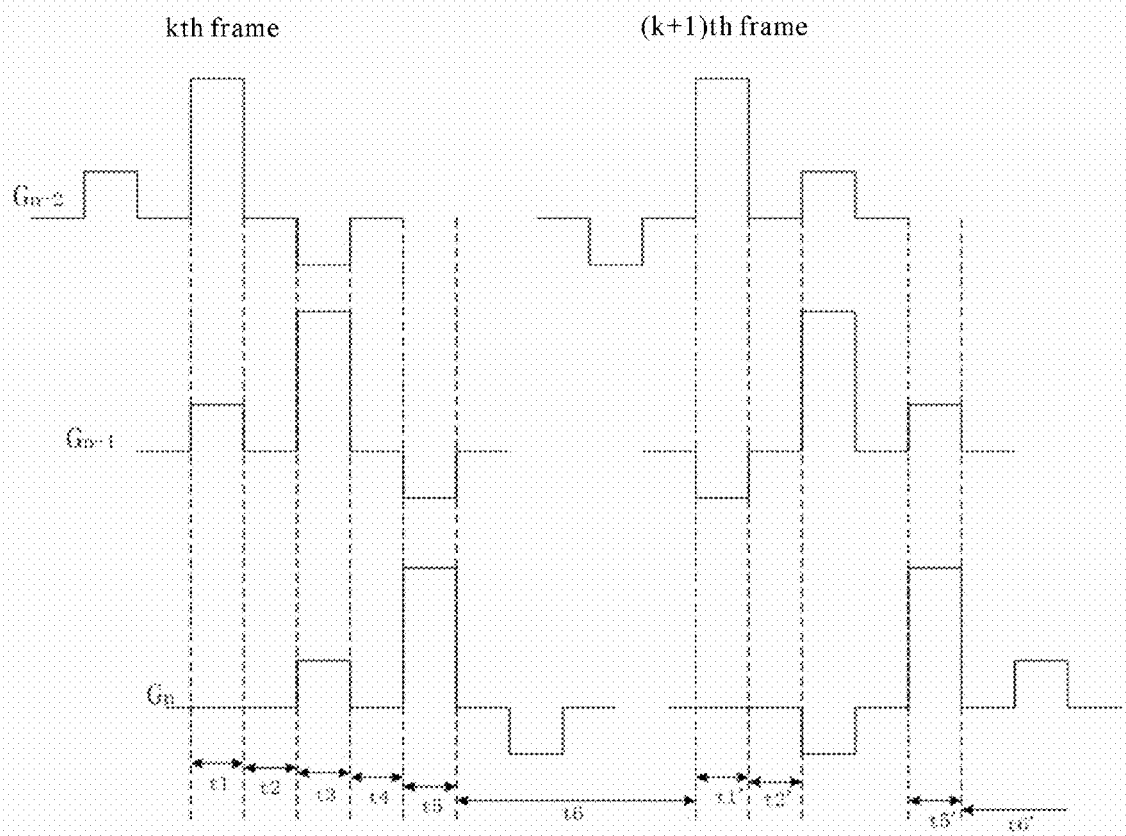
FIG. 12 shows scanning signal waveforms for four-level driving to perform a first type of adjustment according to the second embodiment of the invention.
Figure 13A:
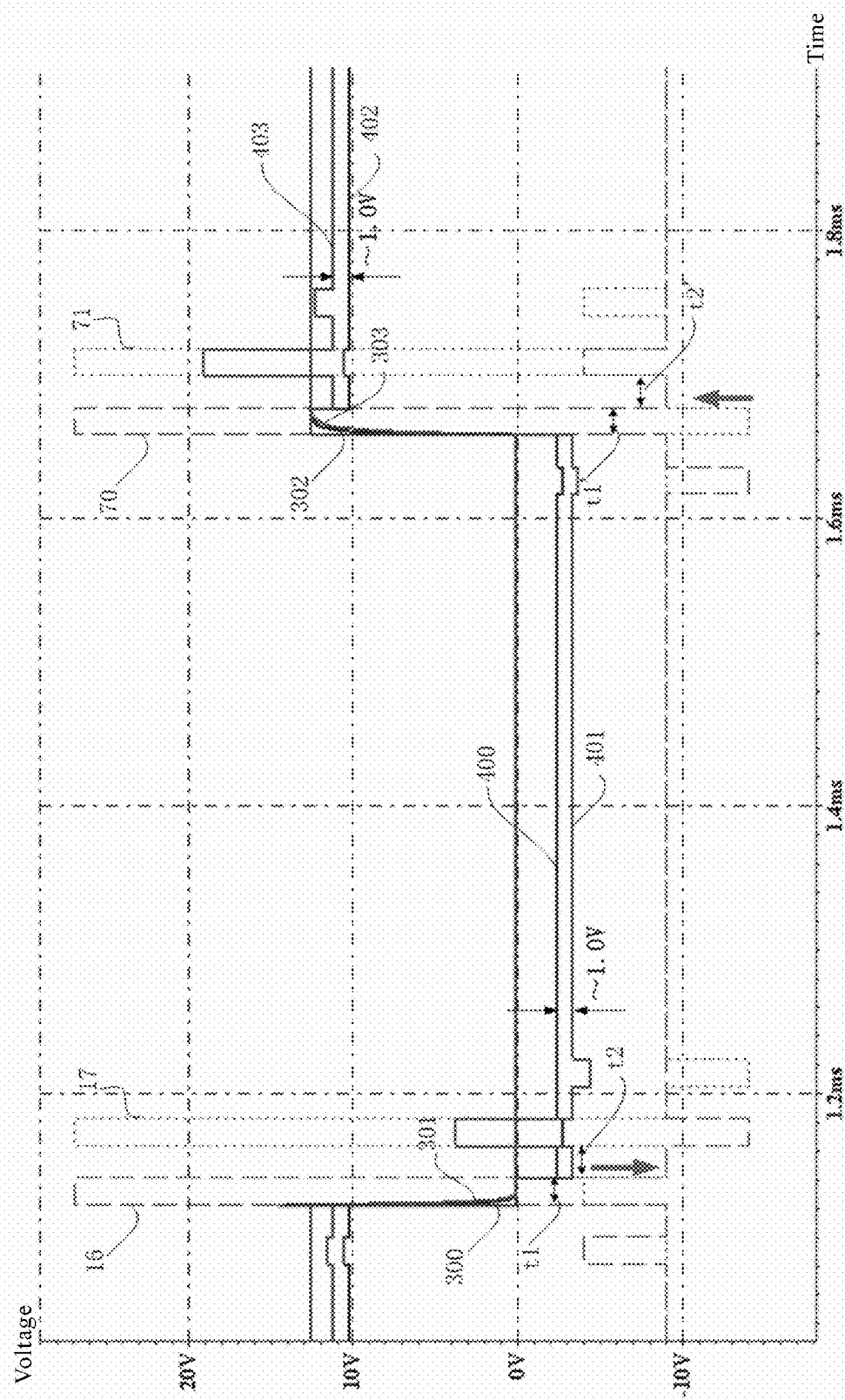
FIG. 13a shows a diagram of the simulation being performed to a pixel P1 in accordance with the driving waveform in FIG. 12, according to the second embodiment of the invention.
Figure 13B:
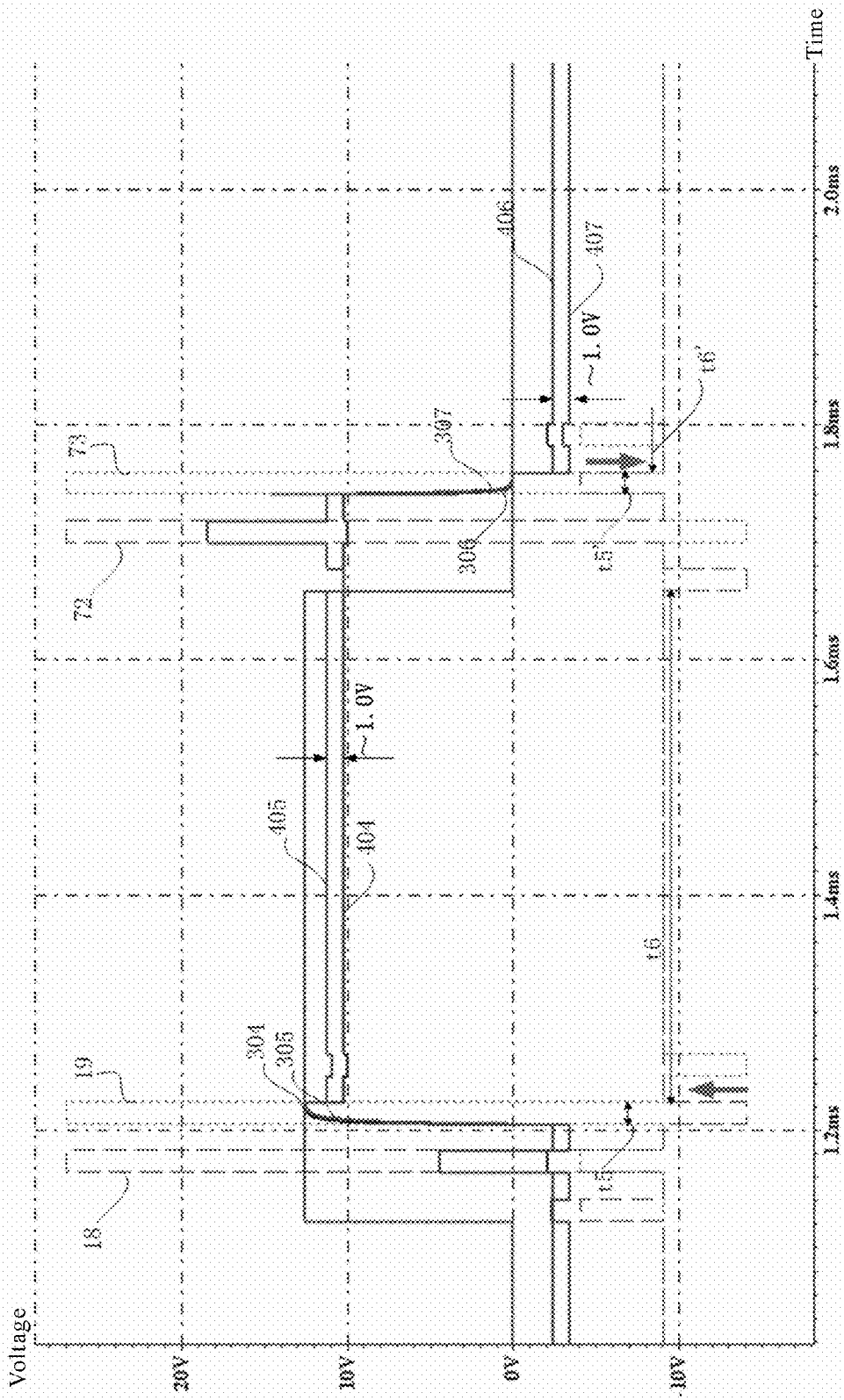
FIG. 13b shows a diagram of the simulation being performed to a pixel P2 in accordance with the driving waveform in FIG. 12, according to the second embodiment of the invention.

FIG. 12 shows the four-level driving waveform to perform the first type of adjustment according to the second embodiment. FIG. 13a shows a diagram of the simulation being performed for the pixel P1 by the driving waveform in FIG. 12 according to the embodiment, and FIG. 13b shows a diagram of the simulation being performed for the pixel P2 by the driving waveform in FIG. 12 according to the embodiment, wherein the voltages of the pixels P1 and P2 during different periods under the driving based on the driving waveform in FIG. 12 are illustrated. The first type of adjustment by the four-level driving can make the voltage of the second sub-pixel increased when the pixel polarity is positive and decreased when the pixel polarity is negative.

Referring to FIG. 12, in the kth frame, during the period t1, the pixel P1 coupled to the scanning line G(n−2) is turned ON and charged with a negative polarity voltage. During the period t5, the pixel P2 coupled to the scanning line Gn is turned ON and charged with a positive polarity voltage. At the beginning of the period t2, the voltage signal on the scanning line G(n−2) is shut off, while a descending voltage occurs on the scanning line G(n−1) to adjust the voltage of the second sub-pixel P12 in the negative polarity pixel P1; at the beginning of the period t6, the voltage signal on the scanning line Gn is shut off, while an ascending voltage occurs on the scanning line G(n−1) to adjust the voltage of the fourth sub-pixel P22 in the positive polarity pixel P2. In the (k+1)th frame, compared with that in the kth frame, the polarities of the pixels P1 and P2 are exchanged, the driving voltage signals on the scanning line G(n−1) at the beginning of the periods t2' and t6' are exchanged and consequently the adjustments for the pixels P1 and P2 are also exchanged.

Referring to FIG. 13a, the adjustment for the pixel P1 will be described. In the kth frame, during the period t1, a voltage 16 on the scanning line G(n−2) turns the switch Q1 and the second switch Q1' ON, a first negative polarity voltage 300 is charged into the first sub-pixel P11, and a second negative polarity voltage 301 is charged into the second sub-pixel P12. At the beginning of the period t2, the switch Q1 and the second switch Q1' are turned OFF, while a descending voltage occurs on the scanning line G(n−1). Because the third storage capacitor Cst3 produces a coupling voltage on the second liquid crystal capacitor Clcb in accordance with the descending voltage, an adjustment is made to the voltage of the second sub-pixel P12, the value of the voltage on the second sub-pixel P12 is reduced and thus after feed-through, a voltage 401 on the second sub-pixel P12 is lower than a voltage 400 on the first sub-pixel P11 and there is a voltage difference 1.0V therebetween. In the (k+1)th frame, during the period t1', a voltage 70 on the scanning line G(n−2) turns the switch Q1 and the second switch Q1' ON, a first positive polarity voltage 302 is charged into the first sub-pixel P11, and a second positive polarity voltage 303 is charged into the second sub-pixel P12. At the beginning of the period t2', the switch Q1 and the second switch Q1' are turned OFF, while an ascending voltage occurs on the scanning line G(n−1). Because the third storage capacitor Cst3 produces a coupling voltage on the second liquid crystal capacitor Clcb in accordance with the ascending voltage, an adjustment is made to the voltage of the second sub-pixel P12, the value of the voltage on the second sub-pixel P12 is increased and thus after feed-through, a voltage 403 on the second sub-pixel P12 is higher than a voltage 402 on the first sub-pixel P11 and there is a voltage difference 1.0V therebetween.

Referring to FIG. 13b, the adjustment for the pixel P2 will be described. In the kth frame, during the period t5, a voltage 19 on the scanning line Gn turns the switch Q2 and the second switch Q2' ON, a first positive polarity voltage 304 is charged into the third sub-pixel P21, and a second positive polarity voltage 305 is charged into the fourth sub-pixel P22. At the beginning of the period t6, the switch Q2 and the second switch Q2' are turned OFF, while an ascending voltage occurs on the scanning line G(n−1). Because the third storage capacitor Cst3 produces a coupling voltage on the second liquid crystal capacitor Clcb in accordance with the ascending voltage, an adjustment is made to the voltage of the fourth sub-pixel P22, the value of the voltage on the fourth sub-pixel P22 is increased and thus after feed-through, a voltage 405 on the fourth sub-pixel P22 is higher than a voltage 404 on the third sub-pixel P21 and there is a voltage difference 1.0V therebetween. In the (k+1)th frame, during the period t5', a voltage 73 on the scanning line Gn turns the switch Q2 and the second switch Q2' ON, a first negative polarity voltage 306 is charged into the third sub-pixel P21, and a second negative polarity voltage 307 is charged into the fourth sub-pixel P22. At the beginning of the period t6', the switch Q2 and the second switch Q2' are turned OFF, while a descending voltage occurs on the scanning line G(n−1). Because the third storage capacitor Cst3 produces a coupling voltage on the second liquid crystal capacitor Clcb in accordance with the descending voltage, an adjustment is made to the voltage of the fourth sub-pixel P22, the value of the voltage on the fourth sub-pixel P22 is reduced and thus after feed-through, a voltage 407 on the fourth sub-pixel P22 is lower than a voltage 406 on the third sub-pixel P21 and there is a voltage difference 1.0V therebetween.

As can be seen from the above description, the first type of adjustment according to the second embodiment increases the voltage difference between the two sub-pixels. The first type of adjustment according to the second embodiment is seemingly different from the first type of adjustment for reducing the voltage difference between the sub-pixels according to the first embodiment, however the actual principle of the adjustment is still to make the voltage of the second sub-pixel increased when the pixel polarity is positive and decreased when the pixel polarity is negative. Just because of the pixel structure of the second embodiment, the voltage difference between the two sub-pixels under the common two-level driving is very small, both the first and second types of adjustments result in a larger voltage difference between the two sub-pixels. If the voltage difference between the two sub-pixels under the common two-level driving is larger, an effect of reducing the voltage difference can certainly be achieved according to the above principle of adjustment.

Below, the second type of adjustment implemented by four-level driving according to the second embodiment of the invention will be described with reference to FIGS. 14, 15a and 15b.

Figure 14:
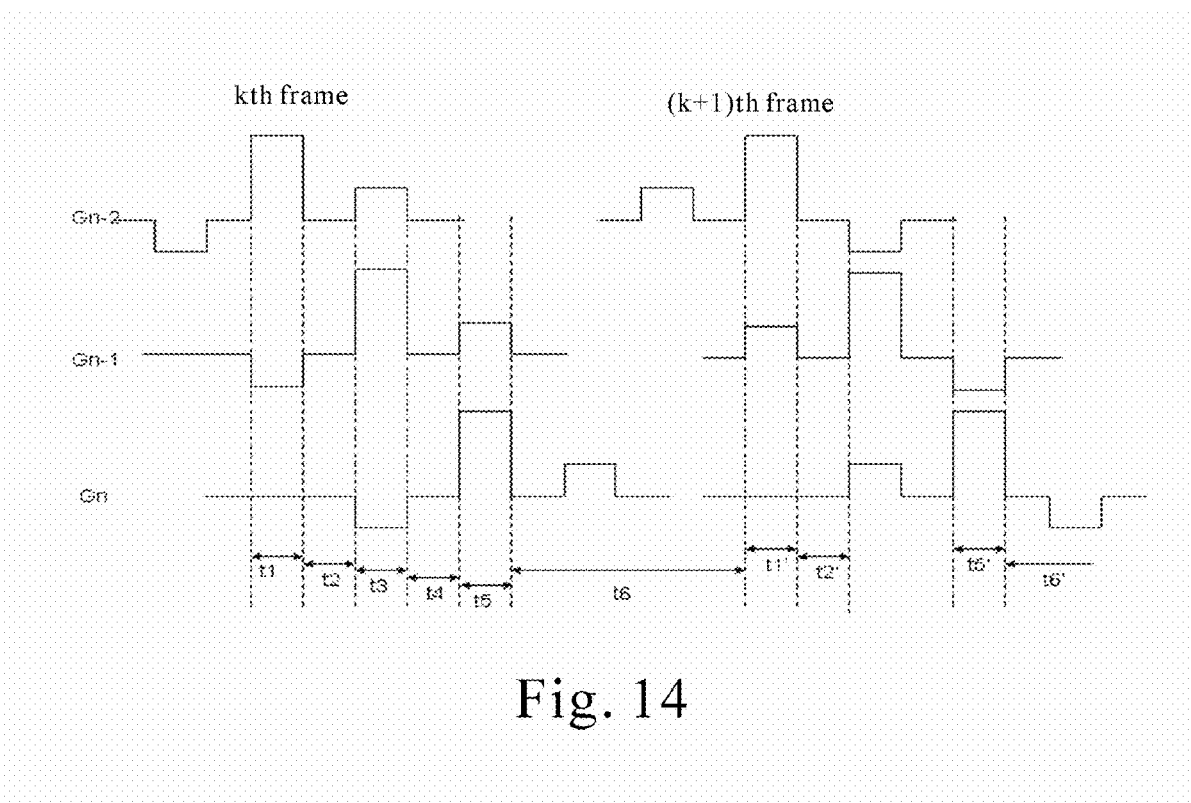
FIG. 14 shows scanning signal waveforms for four-level driving to perform a second type of adjustment according to the second embodiment of the invention.

FIG. 14 shows four-level driving waveforms to perform the second type of adjustment according to the second embodiment. FIG. 15a shows a diagram of the simulation being performed for the pixel P1 by the driving waveform in FIG. 14 according to the embodiment, and FIG. 15b shows a diagram of the simulation being performed for the pixel P2 by the driving waveform in FIG. 14 according to the embodiment, wherein the voltages of the pixels P1 and P2 during different periods under the driving based on the driving waveform in FIG. 14 are illustrated. The second type of adjustment by the four-level driving can make the voltage of the second sub-pixel decreased when the pixel polarity is positive and increased when the pixel polarity is negative.

Referring to FIG. 14, in the kth frame, during the period t1, the pixel P1 coupled to the scanning line G(n−2) is turned ON and charged with a negative polarity voltage. During the period t5, the pixel P2 coupled to the scanning line Gn is turned ON and charged with a positive polarity voltage. At the beginning of the period t2, the voltage signal on the scanning line G(n−2) is shut off, while an ascending voltage occurs on the scanning line G(n−1) to adjust the voltage of the second sub-pixel P12 in the negative polarity pixel P1; at the beginning of the period t6, the voltage signal on the scanning line Gn is shut off, while a descending voltage occurs on the scanning line G(n−1) to adjust the voltage of the fourth sub-pixel P22 in the positive polarity pixel P2. In the (k+1)th frame, compared with that in the kth frame, the polarities of the pixels P1 and P2 are exchanged, the driving voltage signals on the scanning line G(n−1) at the beginning of the periods t2' and t6' are exchanged and consequently the adjustments for the pixels P1 and P2 are also exchanged.

Figure 15A:
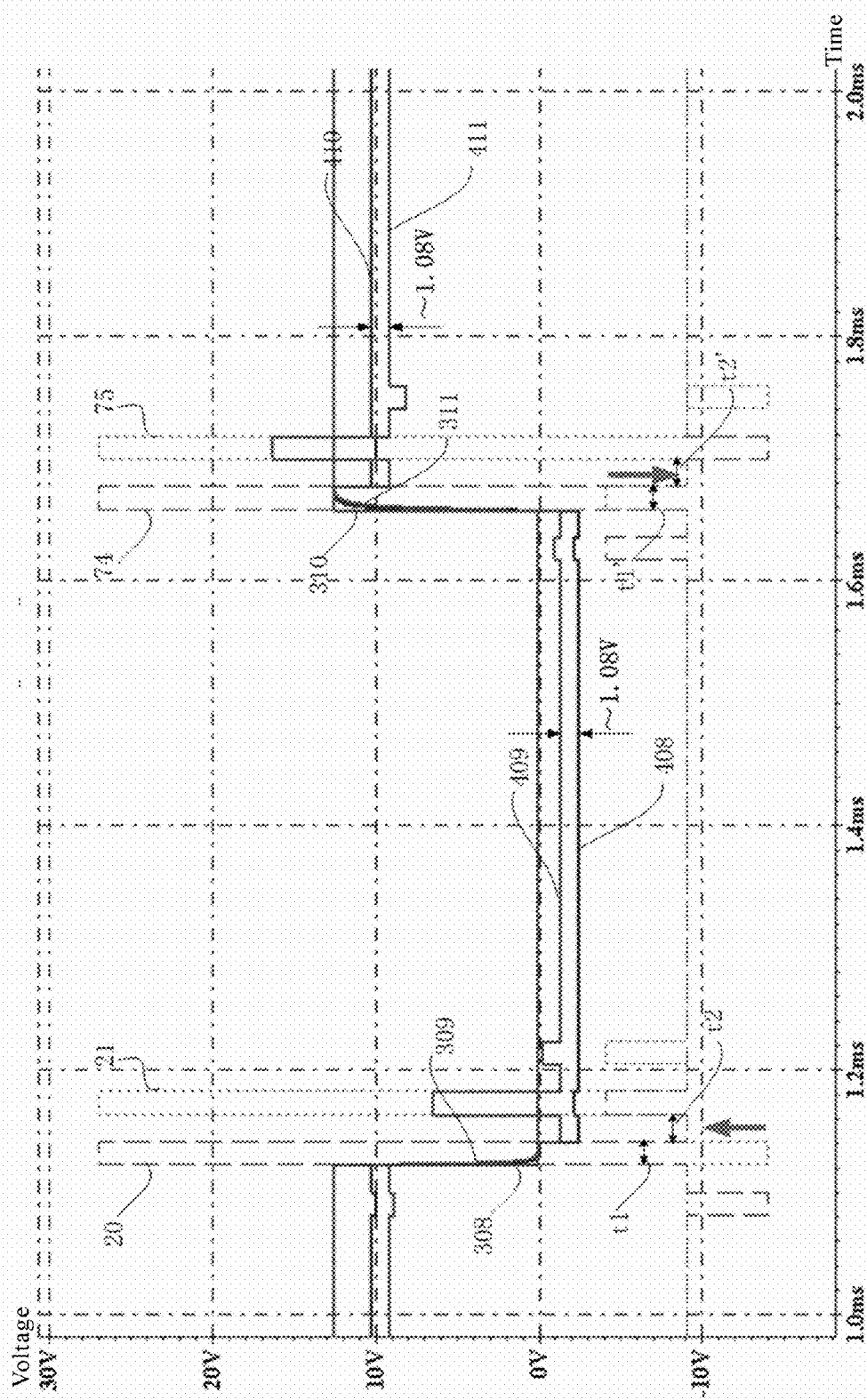
FIG. 15a shows a diagram of the simulation being performed to the pixel P1 in accordance with the driving waveform in FIG. 14, according to the second embodiment of the invention.

Referring to FIG. 15a, the adjustment for the pixel P1 will be described. In the kth frame, during the period t1, a voltage 20 on the scanning line G(n−2) turns the switch Q1 and the second switch Q1' ON, a first negative polarity voltage 308 is charged into the first sub-pixel P11, and a second negative polarity voltage 309 is charged into the second sub-pixel P12. At the beginning of the period t2, the switch Q1 and the second switch Q1' are turned OFF, while an ascending voltage occurs on the scanning line G(n−1). Because the third storage capacitor Cst3 produces a coupling voltage on the second liquid crystal capacitor Clcb in accordance with the ascending voltage, an adjustment is made to the voltage of the second sub-pixel P12, the value of the voltage on the second sub-pixel P12 is increased and thus after feed-through, a voltage 409 on the second sub-pixel P12 is higher than a voltage 408 on the first sub-pixel P11 and there is a voltage difference 1.08V therebetween. In the (k+1)th frame, the pixel P1 has a positive polarity, it is desirable to reduce the voltage of the second sub-pixel P12 so as to increase the voltage difference between the sub-pixels, and thus the scanning waveform for the (k+1)th frame can be utilized. During the period t1', a voltage 74 on the scanning line G(n−2) turns the switch Q1 and the second switch Q1' ON, a first positive polarity voltage 310 is charged into the first sub-pixel P11, and a second positive polarity voltage 311 is charged into the second sub-pixel P12. At the beginning of the period t2', the switch Q1 and the second switch Q1' are turned OFF, while a descending voltage occurs on the scanning line G(n−1). Because the third storage capacitor Cst3 produces a coupling voltage on the second liquid crystal capacitor Clcb in accordance with the descending voltage, an adjustment is made to the voltage of the second sub-pixel P12, the value of the voltage on the second sub-pixel P12 is reduced and thus after feed-through, a voltage 411 on the second sub-pixel P12 is lower than a voltage 410 on the first sub-pixel P11 and there is a voltage difference 1.08V therebetween.

Figure 15B:
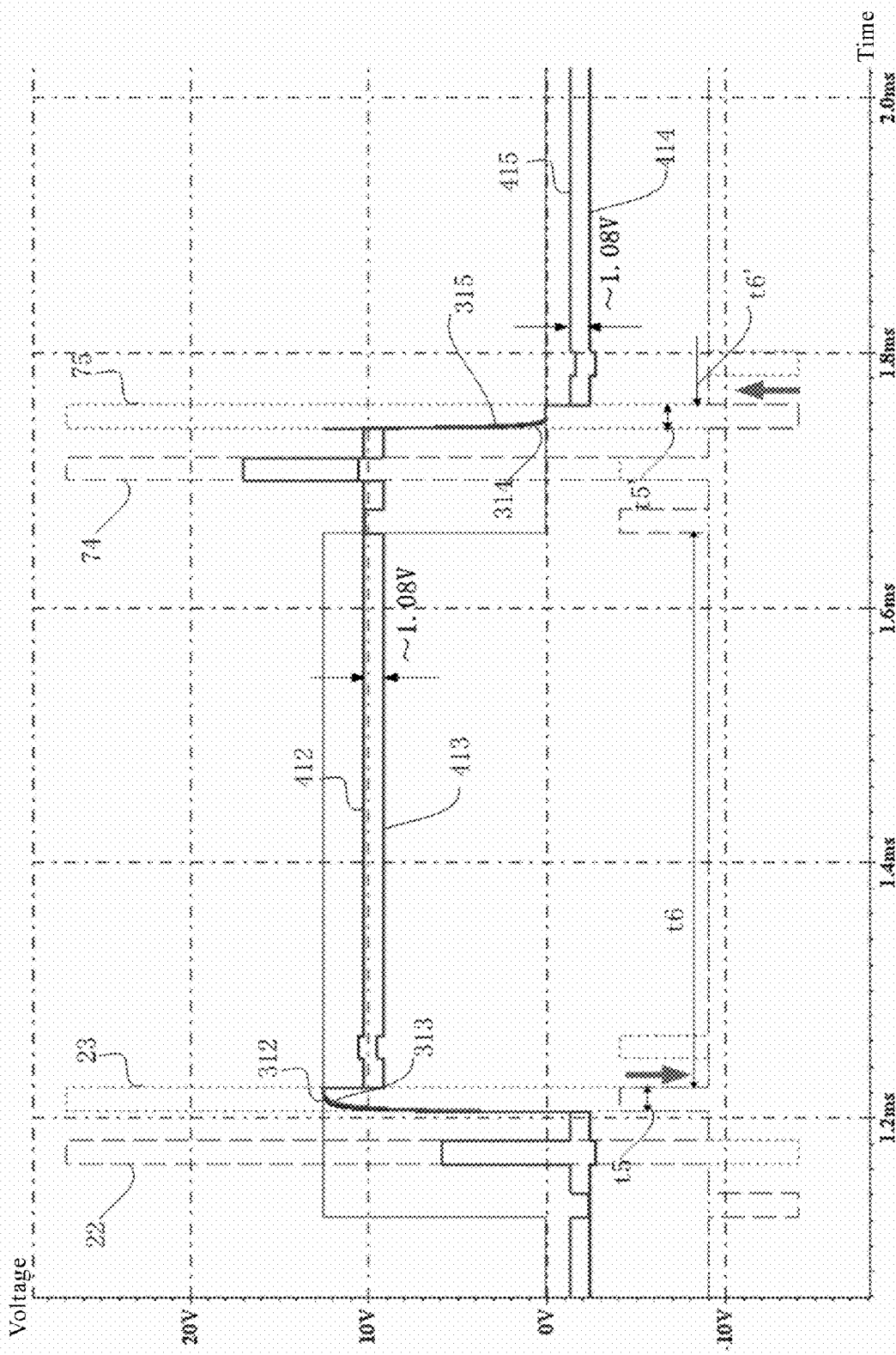
FIG. 15b shows a diagram of the simulation being performed to the pixel P2 in accordance with the driving waveform in FIG. 14, according to the second embodiment of the invention.

Referring to FIG. 15b, the adjustment for the pixel P2 will be described. In the kth frame, during the period t5, a voltage 23 on the scanning line Gn turns the switch Q2 and the second switch Q2' ON, a first positive polarity voltage 312 is charged into the third sub-pixel P21, and a second positive polarity voltage 313 is charged into the fourth sub-pixel P22. At the beginning of the period t6, the switch Q2 and the second switch Q2' are turned OFF, while a descending voltage occurs on the scanning line G(n−1). Because the third storage capacitor Cst3 produces a coupling voltage on the second liquid crystal capacitor Clcb in accordance with the descending voltage, an adjustment is made to the voltage of the fourth sub-pixel P22, the value of the voltage on the fourth sub-pixel P22 is decreased and thus after feed-through, a voltage 413 on the fourth sub-pixel P22 is lower than a voltage 412 on the third sub-pixel P21 and there is a voltage difference 1.08V therebetween. In the (k+1)th frame, the pixel P2 has a negative polarity, it is desirable to increase the voltage of the fourth sub-pixel P22 so as to increase the voltage difference between the sub-pixels, and thus the scanning waveform for the (k+1) th frame can be utilized. During the period t5', a voltage 75 on the scanning line Gn turns the switch Q2 and the second switch Q2' ON, a first negative polarity voltage 314 is charged into the third sub-pixel P21, and a second negative polarity voltage 315 is charged into the fourth sub-pixel P22. At the beginning of the period t6', the switch Q2 and the second switch Q2' are turned OFF, while an ascending voltage occurs on the scanning line G(n−1). Because the third storage capacitor Cst3 produces a coupling voltage on the second liquid crystal capacitor Clcb in accordance with the ascending voltage, an adjustment is made to the voltage of the fourth sub-pixel P22, the value of the voltage on the fourth sub-pixel P22 is increased and thus after feed-through, a voltage 415 on the fourth sub-pixel P22 is higher than a voltage 414 on the third sub-pixel P21 and there is a voltage difference 1.08V therebetween.

As can be seen from the four-level driving waveform for performing the first type of adjustment according to the second embodiment of the invention, the voltage waveforms on each of the scanning lines are the same within a frame, but the voltage waveforms in different frames are different. Likewise, the similar waveform design is also applicable to the second type of adjustment.

The embodiments of the invention have been illustrated in details above. However, the description of these embodiments is only to make the methods and ideas in the invention be easily understood, but not to limit the wide scope of the invention. Moreover, for those skilled in the art, there are various changes and modifications in detailed implements and applications according to the principle of the invention, all of which fall into the scope of the invention as defined by the appending claims.

What is claimed is:

1. A liquid crystal display comprising:
   a plurality of data lines;
   a plurality of scanning lines arranged across the plurality of data lines; and
   a plurality of pixel units each of which is defined by two adjacent scanning lines and two adjacent data lines arranged across the two adjacent scanning lines together and comprises a first sub-pixel and a second sub-pixel, wherein
   the first sub-pixel is coupled to a first scanning line of the two adjacent scanning lines via a switch,
   the second sub-pixel comprises a compensation capacitor, which is coupled to a second scanning line of the two adjacent scanning lines, and
   when the liquid crystal display is in operation, scanning drive signals are respectively applied to the first and the second scanning lines and each scanning drive signal comprises a four-level driving waveform having four voltage values depending on a desired voltage difference between the first and the second sub-pixels.

2. The liquid crystal display according to claim 1, wherein pixel electrodes of the first and the second sub-pixels are coupled to each other via a basic capacitor.

3. The liquid crystal display according to claim 1, wherein pixel electrodes of the first and the second sub-pixels are coupled to each other via a second switch.

4. The liquid crystal display panel according to claim 3, wherein the switch and the second switch are controlled by the first scanning line.

5. The liquid crystal display according to claim 1, wherein when the liquid crystal display utilizes Line Inversion driving, two different kinds of driving waveforms are applied to the same scanning line respectively for odd-numbered and even-numbered frames, and within a frame, two different kinds of driving waveforms are applied to the first and the second scanning lines respectively.

6. The liquid crystal display according to claim 5, wherein the driving waveform in a frame on the first scanning line is the same as the driving waveform in a preceding frame on the second scanning line.

7. The liquid crystal display according to claim 1, wherein each of the plurality of data lines is connected to the pixel units with the same driving polarity in two adjacent columns of pixel units, and each of the plurality of scanning lines is connected to the pixel units with the same driving polarity in a line and the pixel units with an opposite driving polarity in an adjacent line via the switches.

8. The liquid crystal display according to claim 7, wherein when the liquid crystal display utilizes Dot Inversion driving, the driving waveform applied to the first and the second scanning lines in odd-numbered frames is different from that in even-numbered frames, and the same driving waveform is respectively applied to the first and the second scanning lines in the same frame.

9. A method for driving a liquid crystal display, the liquid crystal display comprising a plurality of data lines; a plurality of scanning lines arranged across the plurality of data lines; and a plurality of pixel units each of which is defined by two adjacent scanning lines and two adjacent data lines arranged across the two adjacent scanning lines together and comprises a first sub-pixel and a second sub-pixel, wherein the first sub-pixel is connected to a first scanning line of the two adjacent scanning lines via a switch, and the second sub-pixel comprises a compensation capacitor coupled to a second scanning line of the two adjacent scanning lines, the method comprising:

applying to the first and the second scanning lines scanning drive signals having a four-level driving waveform with four voltage values;

within a frame, sequentially applying a high level scanning drive signal to the second scanning line and the first scanning line, so that data drive voltages are sequentially applied to the pixel units connected to the second and the first scanning lines via the data lines; and when a low level scanning drive signal is applied to the first scanning line, applying an adjusting voltage signal to the second scanning line, wherein the level of the adjusting voltage signal is determined in accordance with a desired voltage difference between the first and the second sub-pixels and not beyond the level of the high level scanning drive signal on the second scanning line.

10. The method for driving the liquid crystal display according to claim 9, wherein when the liquid crystal display utilizes Line Inversion driving, applying two different kinds of scanning drive waveforms to the same scanning line respectively for odd-numbered and even-numbered frames and applying two different kinds of scanning drive waveforms respectively to the first and the second scanning lines with a frame.

11. The method for driving the liquid crystal display according to claim 10, wherein the scanning drive waveform applied to the first scanning line in a frame is the same as the scanning drive waveform applied to the second scanning line in a next frame.

12. The method for driving the liquid crystal display according to claim 9, wherein each of the plurality of data lines is connected to the pixel units with the same driving polarity in two adjacent columns of pixel units, and each of the plurality of scanning lines controls the pixel units with the same driving polarity in a line and the pixel units with an opposite driving polarity in an adjacent line.

13. The method for driving the liquid crystal display according to claim 12, wherein when the liquid crystal display utilizes Dot Inversion driving, applying two different kinds of scanning drive waveforms to the same scanning line respectively for odd-numbered and even-numbered frames, and applying the same scanning drive waveforms on the first and the second scanning lines.

* * * * *